US012671823B2

(12) United States Patent
Filippov et al.

(10) Patent No.: US 12,671,823 B2
(45) Date of Patent: Jun. 30, 2026

(54) METHOD AND APPARATUS FOR INTRA PREDICTION

(71) Applicant: HUAWEI TECHNOLOGIES CO., LTD., Shenzhen (CN)

(72) Inventors: Alexey Konstantinovich Filippov, Moscow (RU); Vasily Alexeevich Rufitskiy, Moscow (RU); Jianle Chen, San Diego, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 5 days.

(21) Appl. No.: 18/828,954

(22) Filed: Sep. 9, 2024

(65) Prior Publication Data

US 2025/0008114 A1 Jan. 2, 2025

Related U.S. Application Data

(63) Continuation of application No. 18/171,458, filed on Feb. 20, 2023, now Pat. No. 12,120,315, which is a
(Continued)

(51) Int. Cl.
*H04N 19/159* (2014.01)
*H04N 19/105* (2014.01)
(Continued)

(52) U.S. Cl.
CPC ......... *H04N 19/159* (2014.11); *H04N 19/105* (2014.11); *H04N 19/132* (2014.11); *H04N 19/176* (2014.11)

(58) Field of Classification Search
CPC .. H04N 19/159; H04N 19/105; H04N 19/132; H04N 19/176; H04N 19/593; H04N 19/136; H04N 19/147; H04N 19/11
See application file for complete search history.

(56) References Cited

U.S. PATENT DOCUMENTS 10,491,893 B1 * 11/2019 Zhao ..................... H04N 19/11
10,944,964 B2 3/2021 Zhao et al.
(Continued)

FOREIGN PATENT DOCUMENTS

| CN | 107071417 A | 8/2017 |
| WO | 2016108188 A1 | 7/2016 |

(Continued)

OTHER PUBLICATIONS

CE3-related: disabling PDPC based on availability of reference samples, Virginie Drugeon , Oct. 3-12, 2018, Joint Video Experts Team (JVET), Macao, CN, JVET-L0204-v2 (Year: 2018).*
(Continued)

*Primary Examiner* — Hesham K Abouzahra
(74) *Attorney, Agent, or Firm* — WOMBLE BOND DICKINSON (US) LLP

(57) ABSTRACT

Apparatuses and methods for intra predicting a block are described. The method of intra predicting a current block can include obtaining a predicted sample value from one or more reference sample values by using an intra prediction mode, obtaining at least one additional reference sample value in accordance with the intra prediction mode, and obtaining a thresholded additional reference sample value based on the additional reference sample value. The method can also include calculating an additional value from the thresholded additional reference sample value, multiplying the predicted sample value by a sample weighting factor, resulting in a weighted predicted sample value, adding the additional value to the weighted predicted sample value, resulting in a non-normalized predicted sample value, and normalizing the non-normalized predicted sample value, resulting in a normalized predicted sample values. The accuracy for the intra prediction is thus increased.

7 Claims, 24 Drawing Sheets

Related U.S. Application Data continuation of application No. 17/345,449, filed on Jun. 11, 2021, now Pat. No. 11,601,653, which is a continuation of application No. PCT/RU2019/050262, filed on Dec. 30, 2019.

(60) Provisional application No. 62/821,422, filed on Mar. 20, 2019, provisional application No. 62/786,349, filed on Dec. 29, 2018.

(51) Int. Cl.
*H04N 19/132* (2014.01)
*H04N 19/176* (2014.01)

(56) References Cited

U.S. PATENT DOCUMENTS

| | | | |
|---|---|---|---|
| 2012/0027316 | A1 | 2/2012 | Wang et al. |
| 2014/0086333 | A1 | 3/2014 | Wang |
| 2015/0172677 | A1 | 6/2015 | Norkin |
| 2017/0332088 | A1 | 11/2017 | Merkle et al. |
| 2020/0045326 | A1 | 2/2020 | Zhao et al. |
| 2020/0092563 | A1 | 3/2020 | Drugeon et al. |
| 2020/0162728 | A1 | 5/2020 | Van Der Auwera et al. |

FOREIGN PATENT DOCUMENTS

| | | | |
|---|---|---|---|
| WO | 2018204664 | A1 | 11/2018 |
| WO | 2018236051 | A1 | 12/2018 |

OTHER PUBLICATIONS

Document: JCTVC-F172, Akira Minezawa et al, An improved intra vertical and horizontal prediction, Joint Collaborative Team on Video Coding (JCT-VC) of ITU-T SG16 WP3 and ISO/IEC JTC1/SC29/WG11, 6th Meeting: Torino, IT, Jul. 14-22, 2011, total 6 pages.

Document: JVET-C0040-r3, F. Galpin et al, Adaptive Clipping in JEM2.0, Joint Video Exploration Team (JVET) of ITU-T SG 16 WP 3 and ISO/IEC JTC 1/SC 29/WG 11, 3rd Meeting: Geneva, CH, May 26-Jun. 1, 2016, total 7 pages.

ITU-T H.261 (Mar. 1993), Line Transmission of Non-Telephone Signals, Video Codec for Audiovisual Services AT p x 64 kbits, total 29 pages.

ITU-T H.264(Apr. 2017), Series H: Audiovisual and Multimedia Systems, Infrastructure of audiovisual services—Coding of moving video, Advanced video coding for generic audiovisual services, total 812 pages.

ITU-T H.265(Feb. 2018), Series H: Audiovisual and Multimedia Systems Infrastructure of audiovisual services—Coding of moving video, High efficiency video coding, total 692 pages.

Mohammed Golam Sarwer, CE3-related: Boundary PDPC, Oct. 3-12, 2018, Joint Video Experts Team (JVET), Document: JVET-L0087-v1 (Year: 2018).

EE1 Related: Simplification and Extension of PDPC: "EE1related: Simplification and extension of PDPC",8. JVET Meeting; Oct. 18, 2017-Oct. 25, 2017; Macau; (The Jointvideo Exploration Team of ISO/ IEC JTC1/SC29/WG11 and ITU-TSG.16); URL: http://phenix.int-evry.fr/jvet/,,No. JVET-H0057-v3, Oct. 18, 2017 (Oct. 18, 2017), XP030151050.

Y-W Chen et al: "Description of SDR, HDR and 360 video codingtechnology proposal by Qualcomm and Technicolor—low and highcomplexity versions", 10. JVET Meeting; Apr. 10, 2018-Apr. 20, 2018; San Diego; (The Jointvideo Exploration Team of ISO/IEC JTC1/SC29/WG11 and ITU-TSG. 16),, No. JVET-J0021 Apr. 14, 2018 (Apr. 14, 2018), XP030248214, Retrieved from the Internet: URL:http://phenix.int-evry.fr/jvet/doc_end_user/documents/ 10_San 20Diego/wg11/JVET-J0021-v5.zip JVET-J0021.docx [retrieved on Apr. 14, 2018].

CE3-related: disabling PDPC based on availability of reference samples, Virginia Drugeon, Oct. 3-12, 2018, Joint Video Experts Team (JVET), Macao, CN, JVET-L0204-v2 (Year: 2018).

Document: JVET-K1001-v5, Benjamin Bross et al, Versatile Video Coding (Draft 2), Joint Video Experts Team (JVET) of ITU-T SG 16 WP 3 and ISO/IEC JTC 1/SC 29/WG 11, 11th Meeting: Ljubljana, SI, Jul. 10-18, 2018, total 136 pages.

Qualcomm Inc. ,CE3: Simplified PDPC (Test 2.4.1), JVET-K0063-v2, Joint Video Experts Team (JVET) of ITU-T SG 16 WP 3 and ISO/IEC JTC 1/SC 29/WG11, 11th Meeting: Ljubljana, SI, Jul. 10 18, 2018, 6 pages.

Benjamin Bross et al, "Versatile Video Coding (Draft 3)", Joint Video Experts Team (JVET) Document: NET-L1001-v6,of ITU-T SG 16 WP 3 and ISO/IEC JTC I/SC 29/WG 11,12th Meeting:Macao, CN,Oct. 3-12, 2018,total 203 pages, XP030251958.

* cited by examiner

The coordinate for vertical and horizontal prediction

DC mode PDPC weights for (0, 0) and (1, 0) positions inside one 4x4 block.

(A) Diagonal top-right mode (B) Diagonal bottom-left mode (C) Adjacent diagonal top-right mode (D) Adjacent diagonal bottom-left mode Definition of samples used by PDPC extension to diagonal and adjacent angular intra modes.

DC mode PDPC weights for (0, 0) and (1, 0) positions inside one 4x4 block.

METHOD AND APPARATUS FOR INTRA PREDICTION

CROSS-REFERENCE TO RELATED APPLICATIONS

This application is a continuation of U.S. patent application Ser. No. 18/171,458, filed on Feb. 20, 2023, which is a continuation of U.S. patent application Ser. No. 17/345,449, filed on Jun. 11, 2021, now U.S. Pat. No. 11,601,653, which is a continuation of International Application No. PCT/RU2019/050262, filed on Dec. 30, 2019, which claims the benefit of U.S. Provisional Application No. 62/786,349, filed on Dec. 29, 2018 and U.S. Provisional Application No. 62/821,422, filed on Mar. 20, 2019. All of the aforementioned patent applications are hereby incorporated by reference in their entireties.

TECHNICAL FIELD

The present disclosure relates to the technical field of image and/or video coding and decoding, and in particular to method and apparatus for intra prediction.

BACKGROUND

Digital video has been widely used since the introduction of DVD-discs. Before transmission the video is encoded and transmitted using a transmission medium. The viewer receives the video and uses a viewing device to decode and display the video. Over the years the quality of video has improved, for example, because of higher resolutions, color depths and frame rates. This has lead into larger data streams that are nowadays commonly transported over internet and mobile communication networks.

Higher resolution videos, however, typically require more bandwidth as they have more information. In order to reduce bandwidth requirements video coding standards involving compression of the video have been introduced. When the video is encoded the bandwidth requirements (or corresponding memory requirements in case of storage) are reduced. Often this reduction comes at the cost of quality. Thus, the video coding standards try to find a balance between bandwidth requirements and quality.

The High Efficiency Video Coding (HEVC) is an example of a video coding standard that is commonly known to persons skilled in the art. In HEVC, a coding unit (CU) is split into prediction units (PU) or transform units (TUs). The Versatile Video Coding (VVC) next generation standard is the most recent joint video project of the ITU-T Video Coding Experts Group (VCEG) and the ISO/IEC Moving Picture Experts Group (MPEG) standardization organizations, working together in a partnership known as the Joint Video Exploration Team (JVET). VVC is also referred to as ITU-T H.266/Next Generation Video Coding (NGVC) standard. In VVC, the concepts of multiple partition types shall be removed, i.e. the separation of the CU, PU and TU concepts except as needed for CUs that have a size too large for the maximum transform length, and supports more flexibility for CU partition shapes.

Processing of these coding units (CUs) (also referred to as blocks) depends on their size, spatial position and a coding mode specified by an encoder. Coding modes can be classified into two groups according to the type of prediction: intra-prediction and inter-prediction modes. Intra prediction modes use samples of the same picture (also referred to as frame or image) to generate reference samples to calculate the prediction values for the samples of the block being reconstructed. Intra prediction is also referred to as spatial prediction. Inter-prediction modes are designed for temporal prediction and uses reference samples of previous or next pictures to predict samples of the block of the current picture.

There is a need for apparatuses and methods for video coding, which allow for an efficient handling of an intra prediction process.

SUMMARY

Methods of intra predicting a block of a picture, encoding device, decoding device, and computer-readable medium are provided.

As an example of a first aspect of the invention, a method of intra predicting a block of a picture is provided, and the method includes:

obtaining a predicted sample value from one or more reference sample values by intra-prediction using an intra predication mode, wherein the intra prediction mode is one of a DC intra prediction mode, a horizontal intra-predication mode, or a vertical intra predication mode;

obtaining the values of the nearest reference samples located above and to the left of the predicted sample;

obtaining, in accordance with the intra prediction mode, one or more additional reference sample values, wherein:

when the intra prediction mode is vertical, additional reference sample value is set equal to the difference between the value of the nearest reference sample located above the predicted sample and the value of the top-left reference sample, when the intra prediction mode is horizontal, additional reference sample value is set equal to the difference between the value of the nearest reference sample located to the left of the predicted sample and the value of the top-left reference sample, when the intra prediction mode is a DC intra prediction mode, the first additional reference sample value and the second additional reference sample value are obtained by setting the first additional reference sample value equal to the value of the nearest reference sample located to the left of the predicted sample, and setting the second additional reference sample value equal to the value of the nearest reference sample located above the predicted sample;

thresholding an additional reference sample value when the intra prediction mode is either horizontal or vertical;

calculating an additional value either as a weighted sum of the first additional reference sample and the second additional reference sample when the intra prediction mode is a DC intra prediction mode, or by multiplying weighting factor by the additional reference sample value when the intra prediction mode is either horizontal or vertical;

multiplying the predicted sample value by a sample weighting factor, resulting in a weighted predicted sample value, wherein the sample weighting factor is set equal to one when the intra prediction mode is either horizontal or vertical;

adding an additional value to the weighted predicted sample value, resulting in a non-normalized predicted sample value; and normalizing the non-normalized predicted sample value by an arithmetic right shift of an integer representation of the non-normalized predicted sample value, resulting in a normalized predicted sample value.

As an embodiment of the first aspect, the method further includes derivation of the minimum and maximum values of a predicted sample, where thresholding an additional reference sample value includes:

obtaining top-left reference sample value; and updating the additional reference sample value, comprising a check whether it is greater than an upper limit value or lower than a lower limit, wherein when the top-left reference sample value is greater than the predicted sample value, the upper limit is obtained by subtracting predicted sample value from the maximum value of the predicted sample, the updated additional reference sample value is set equal to the maximum of two values, the first value is the additional reference sample value, and the second value is the upper limit, otherwise, the lower limit is obtained by subtracting predicted sample value from the minimum value of the predicted sample, the updated additional reference sample value is set equal to the minimum of two values, the first value is the additional reference sample value, and the second value is the lower limit.

As an example of a second aspect of an embodiment of the invention, a method of intra predicting a block of a picture is provided, and the method includes: obtaining an intra prediction mode of a current block; and performing position-dependent prediction combination (PDPC) based on the top sample or left sample when the intra prediction mode is DC mode or planar mode, top-left sample is not used for position-dependent prediction combination (PDPC).

As an example of a third aspect of an embodiment of the invention, a method of intra predicting a block of a picture is provided, and the method includes: obtaining an intra prediction mode of a current block; clipping operation in position-dependent prediction combination (PDPC) is performed when the intra prediction mode is horizontal intra prediction mode or vertical intra prediction mode, and is not performed when the intra prediction mode is DC mode or planar mode.

As an embodiment of the third aspect, the clipping operation in PDPC is performed only when the intra prediction mode is the horizontal intra prediction mode or the vertical intra prediction mode. For example, when predModeIntra is equal to INTRA_ANGULAR18 or INTRA_ANGULAR50:

$$predSamples[x][y] = clip1Cmp($$

$$(refL[x][y] * wL[x] + refT[x][y] * wT[y] - p[-1][-1] * wTL[x][y] + (64 -$$

$$wL[x] - wT[y] + wTL[x][y]) * predSamples[x][y] + 32) >> 6);$$

wherein predModeIntra is used to indicate the intra prediction mode, {x,y} define position of a predicted sample, wT, wL and wTL are weights associated with reference samples in accordance with the defined position.

The method according to the first aspect or any possible embodiment of the first aspect, the second aspect or any possible embodiment of the second aspect, or the third aspect or any possible embodiment of the third aspect, can be performed by the apparatus according to the fourth aspect of the invention.

According to a fifth aspect, embodiments of the invention relate to an apparatus for decoding a video stream includes a processor and a memory. The memory is storing instructions that cause the processor to perform the method according to the first aspect or any possible embodiment of the first aspect, the second aspect or any possible embodiment of the second aspect, or the third aspect or any possible embodiment of the third aspect.

According to a sixth aspect, embodiments of the invention relate to an apparatus for encoding a video stream includes a processor and a memory. The memory is storing instructions that cause the processor to perform the method according to the first aspect or any possible embodiment of the first aspect, the second aspect or any possible embodiment of the second aspect, or the third aspect or any possible embodiment of the third aspect.

According to a seventh aspect, a computer-readable storage medium having stored thereon instructions that when executed cause one or more processors configured to code video data is proposed. The instructions cause the one or more processors to perform a method according to the first aspect or any possible embodiment of the first aspect, the second aspect or any possible embodiment of the second aspect, or the third aspect or any possible embodiment of the third aspect.

According to an eighth aspect, embodiments of the invention relate to a computer program comprising program code for performing the method according to the first aspect or any possible embodiment of the first aspect, the second aspect or any possible embodiment of the second aspect, or the third aspect or any possible embodiment of the third aspect when executed on a computer.

Details of one or more embodiments are set forth in the accompanying drawings and in the description below. Other features, objects, and advantages will be apparent from the description, drawings, and claims.

BRIEF DESCRIPTION OF THE DRAWINGS

In the following embodiments of the invention are described in more detail with reference to the attached figures and drawings, in which.

5

Figure 6:
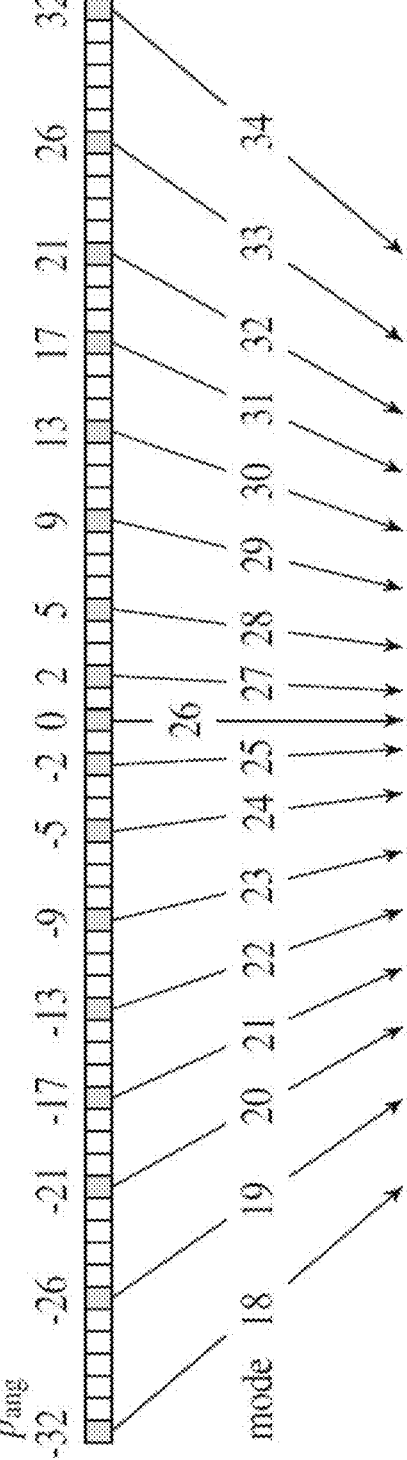
Figure 7:
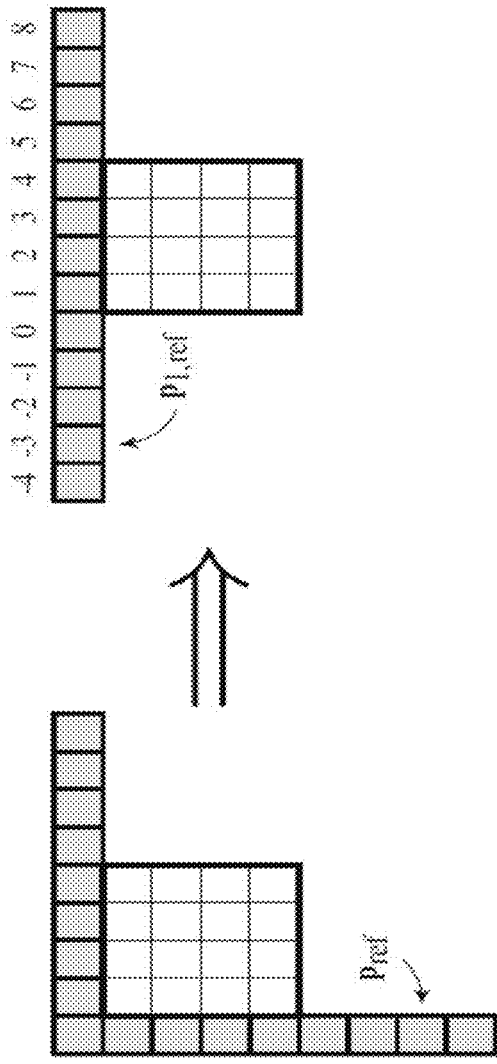
Figure 8:
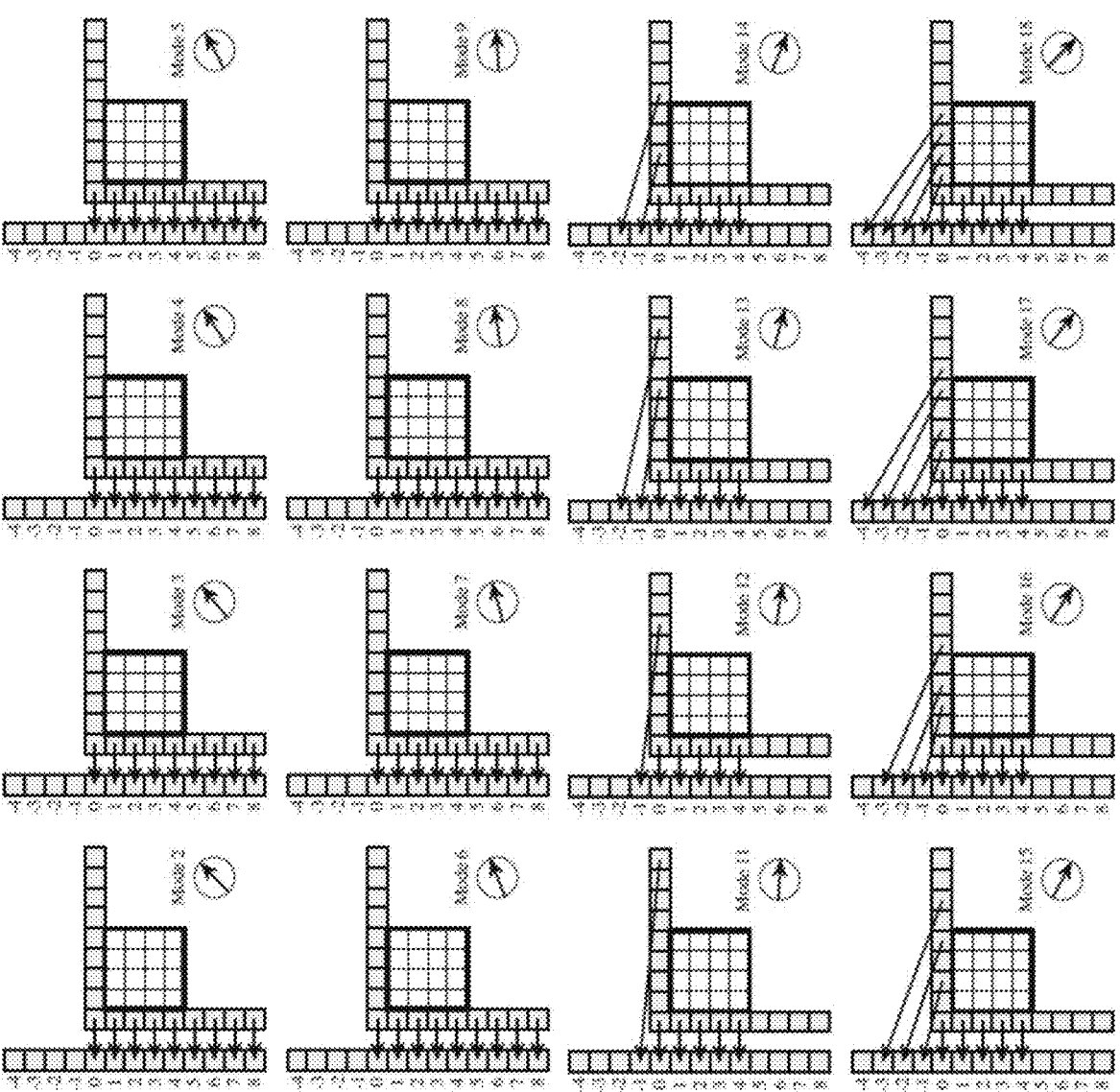
Figure 9:
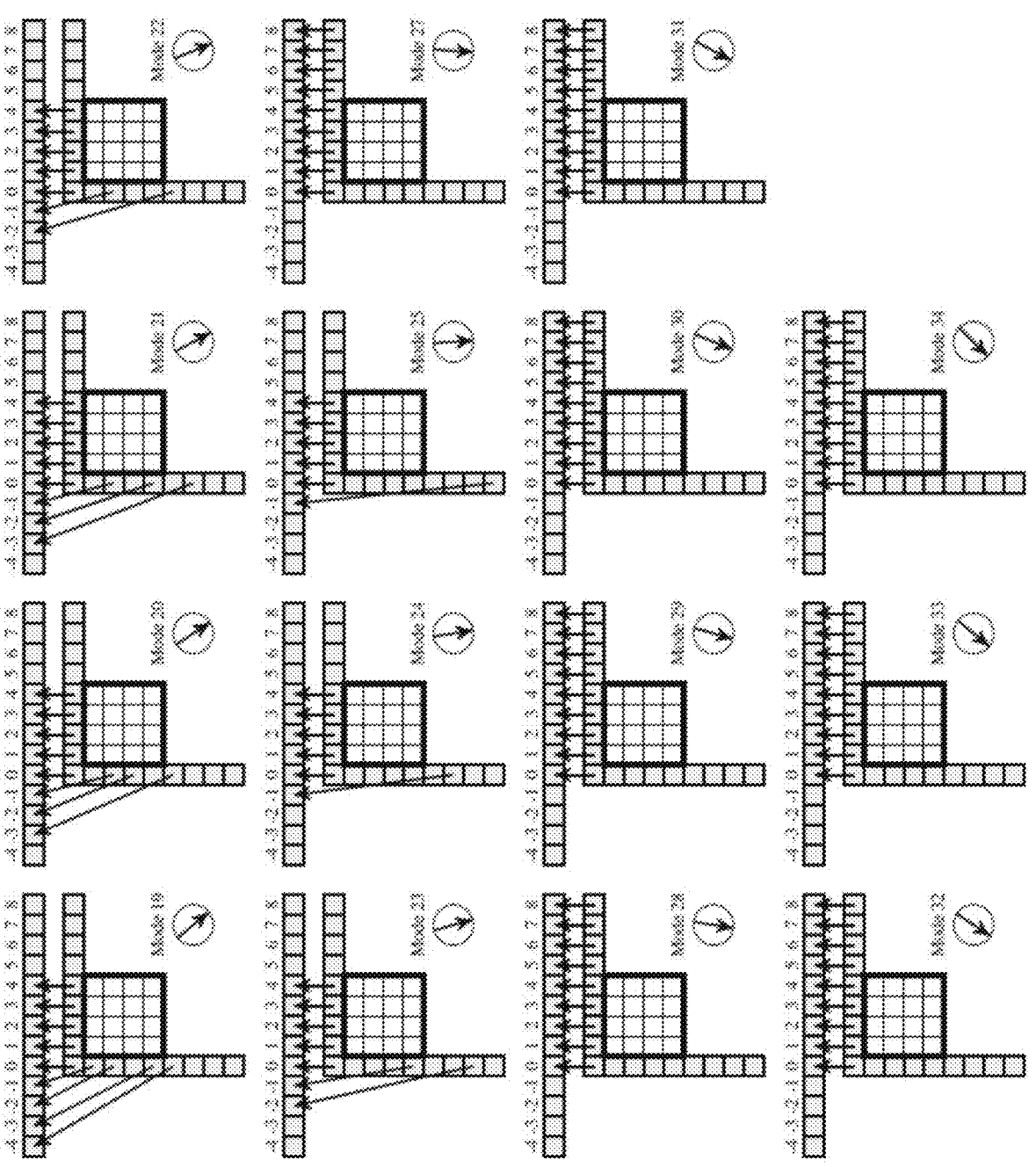
Figure 10A:
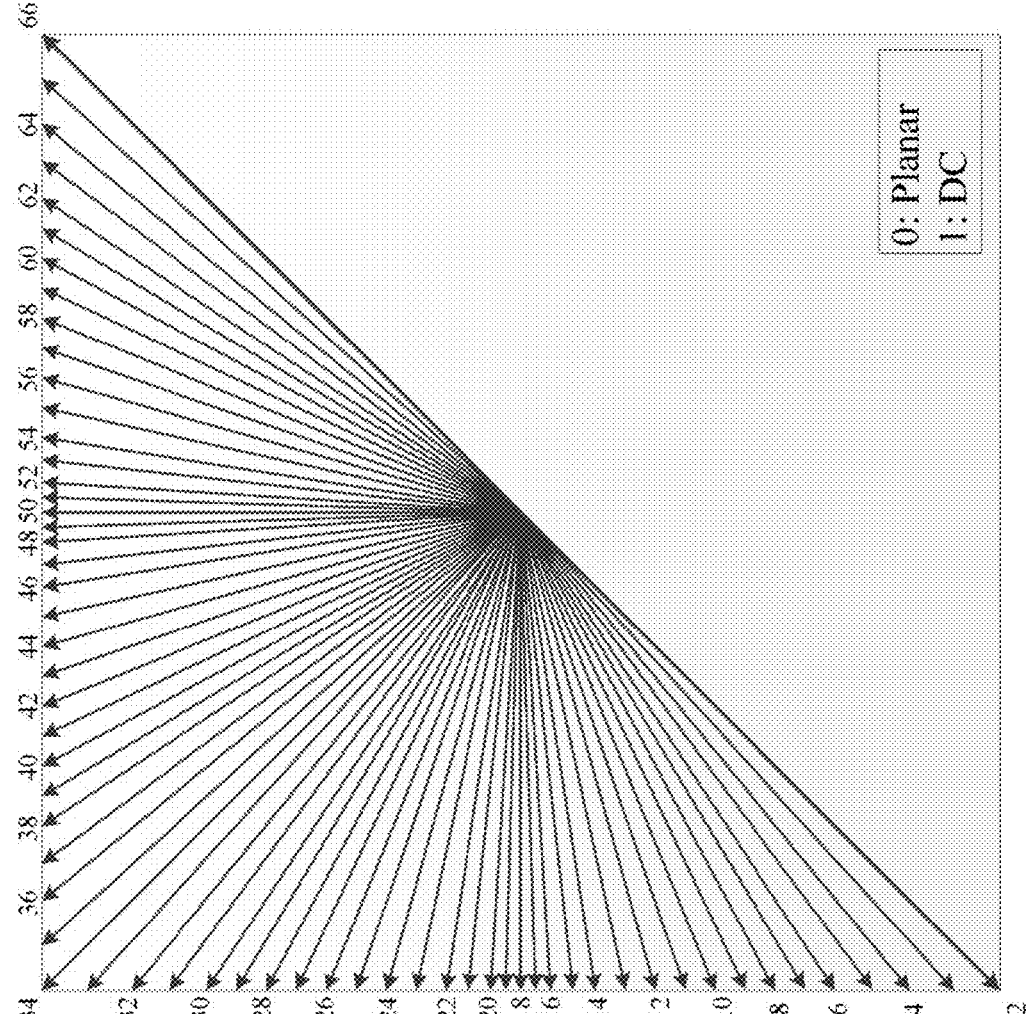
Figure 10B:
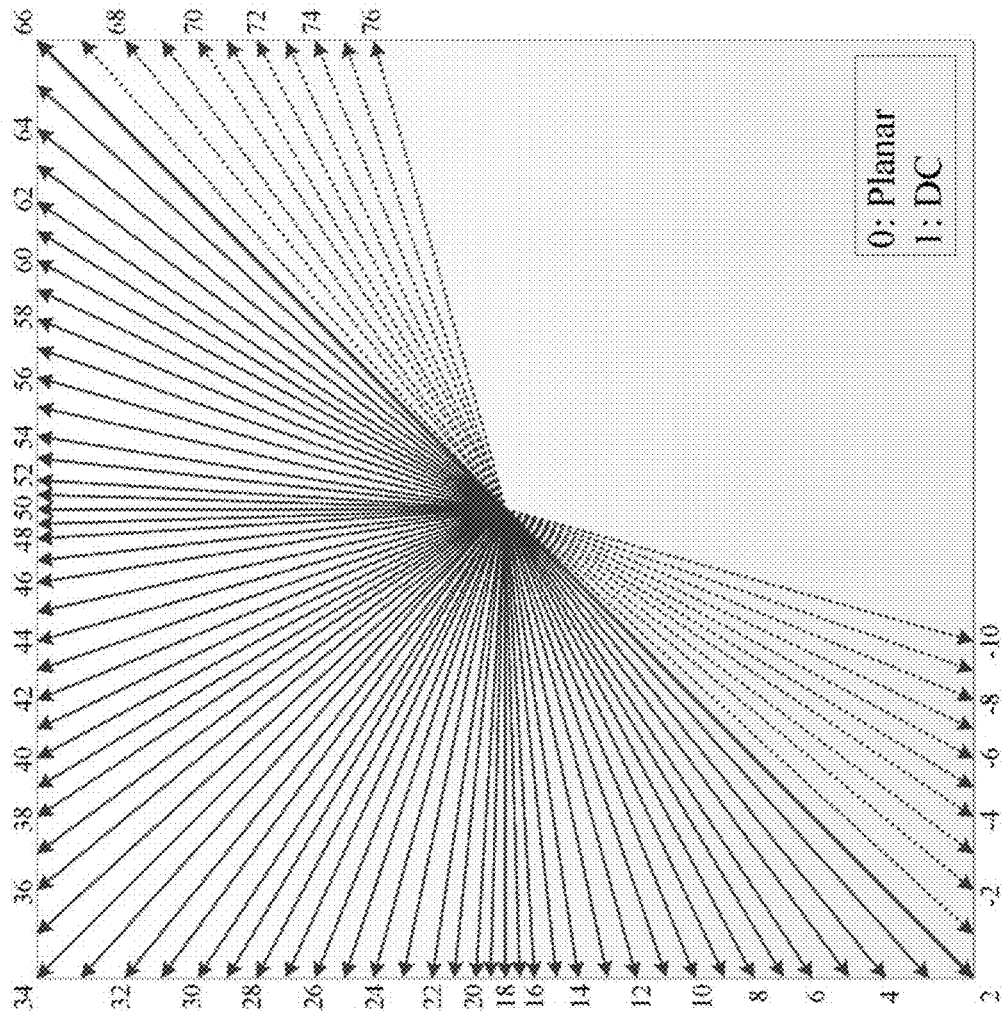
Figure 10C:
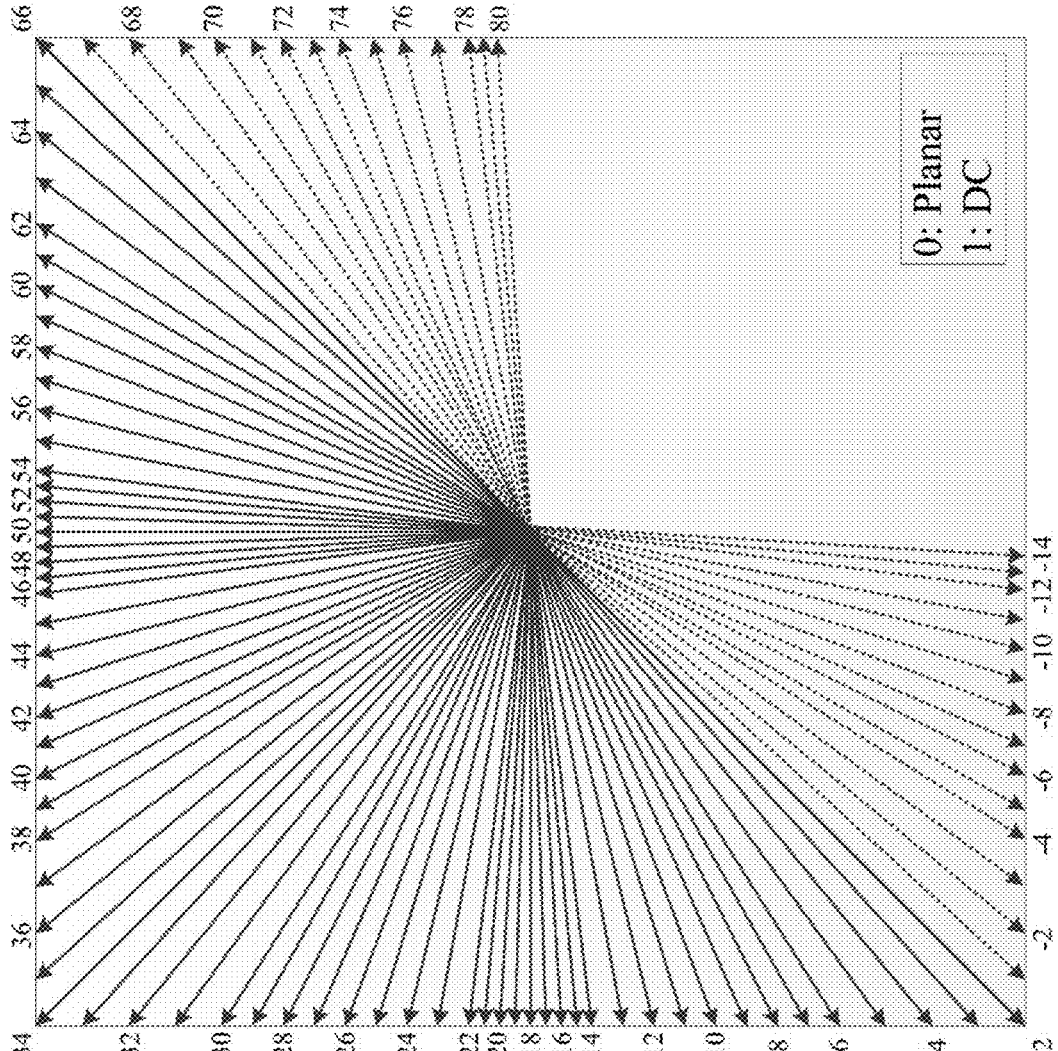
Figure 11:
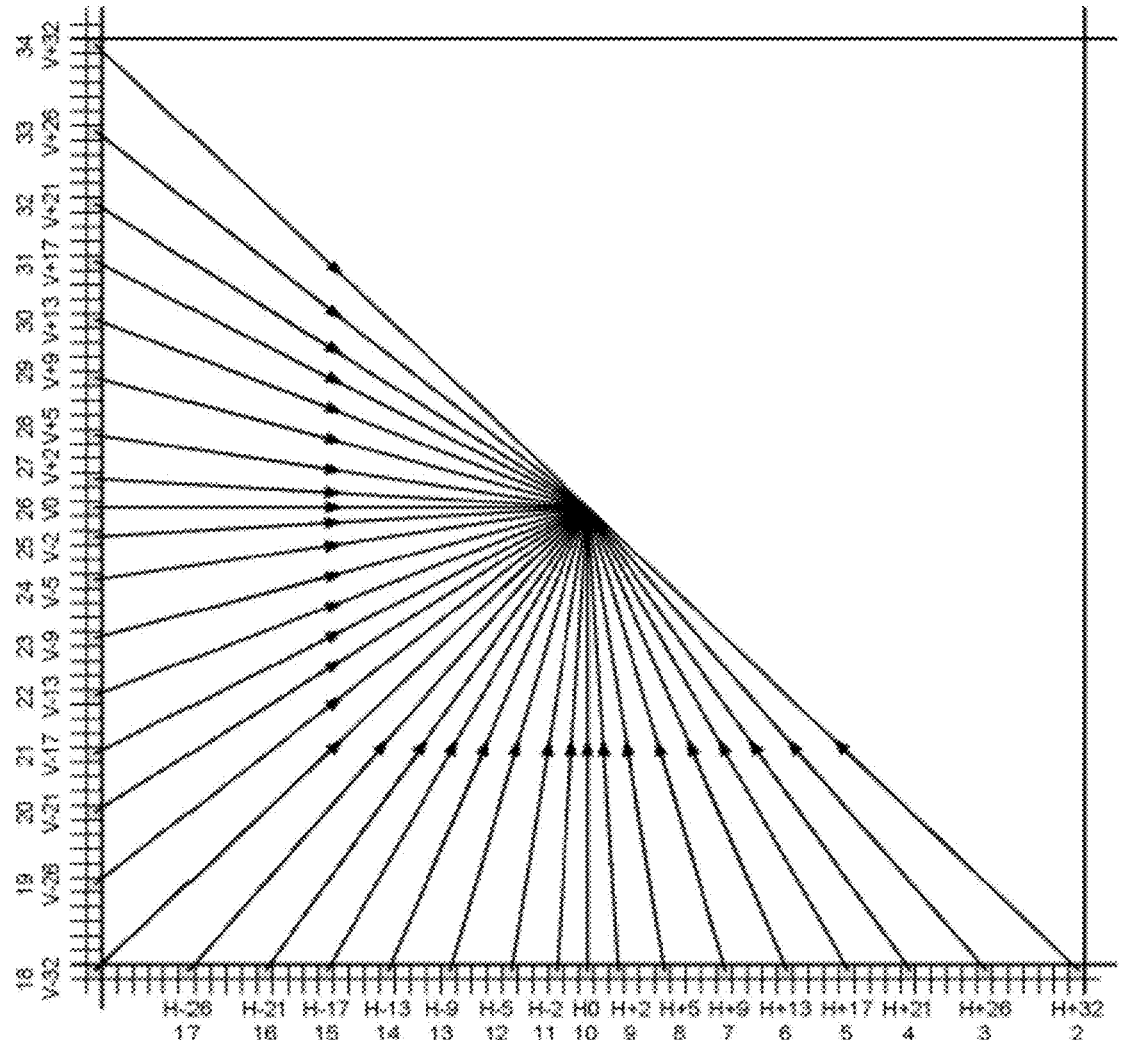
Figure 12:
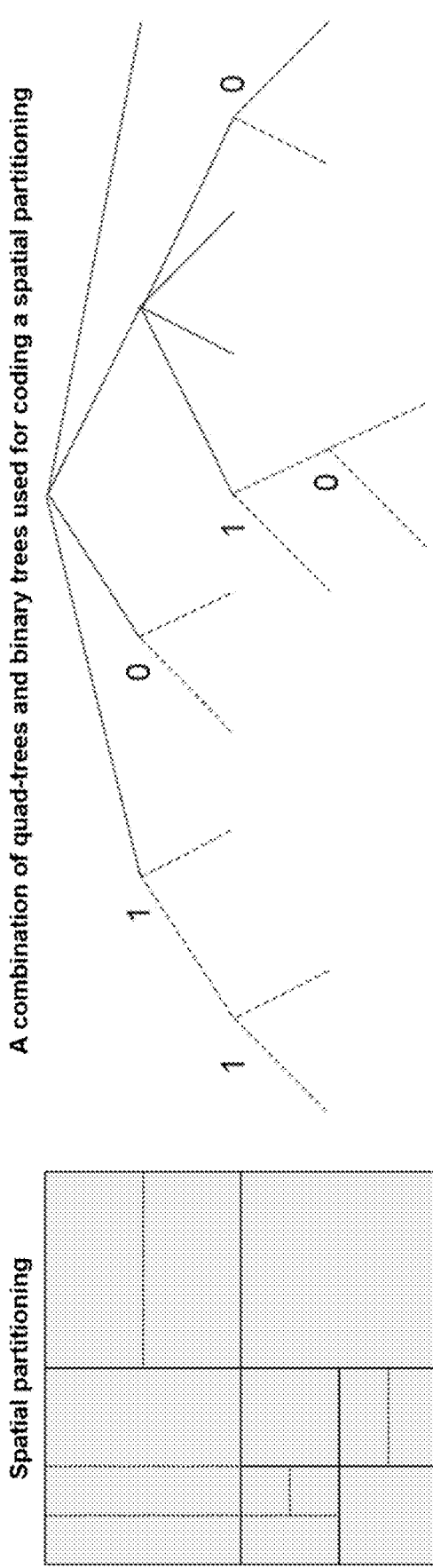
Figure 13A:
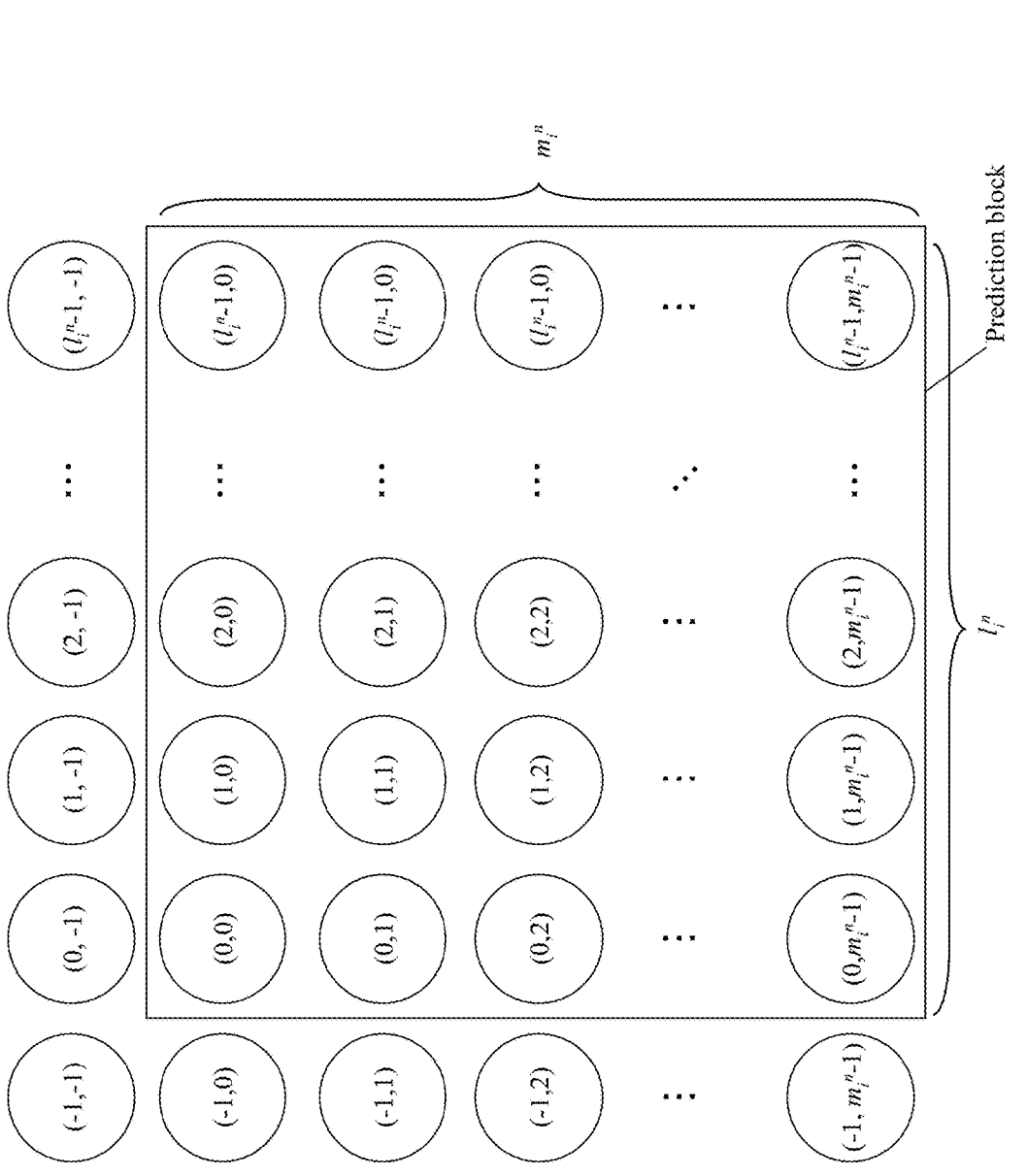
Figure 13B:
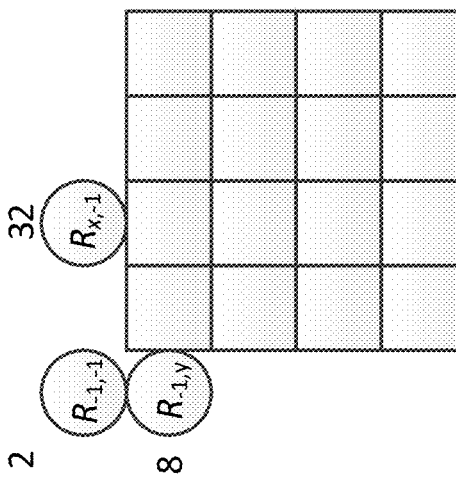
Figure 13B:
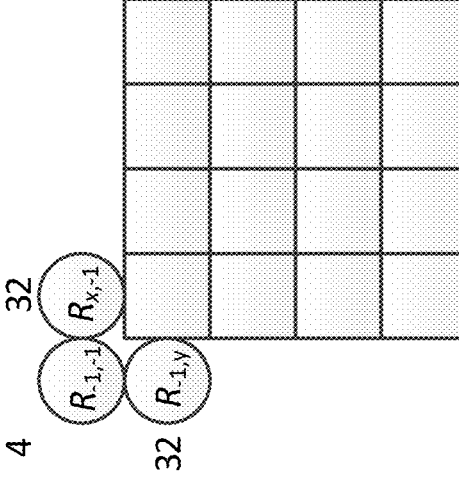
Figure 14:
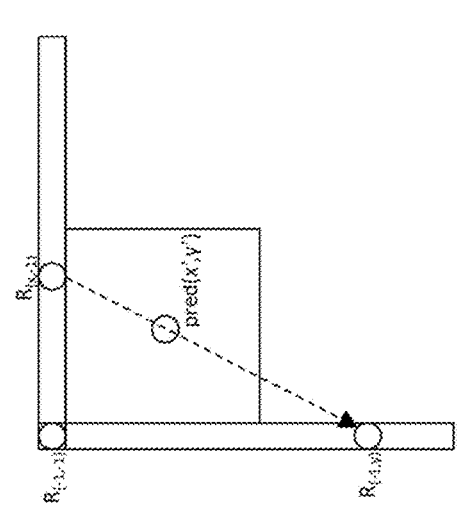
Figure 14:
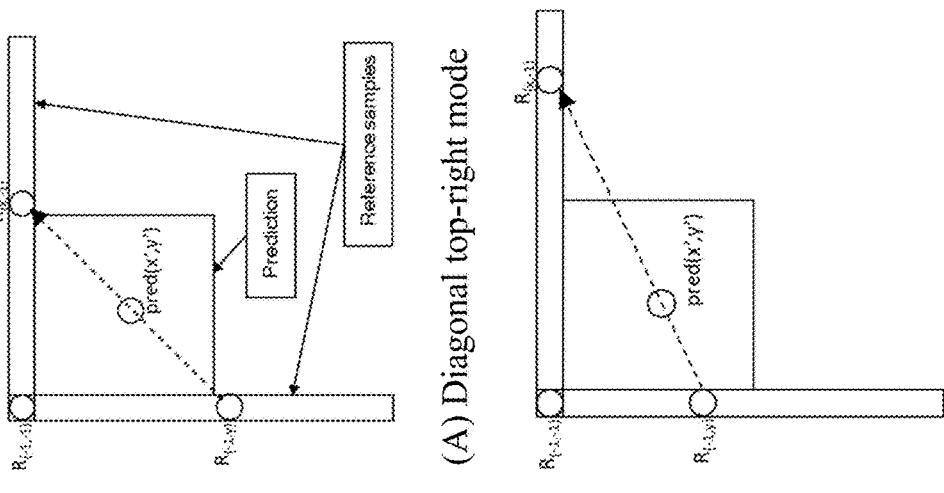
Figure 15:
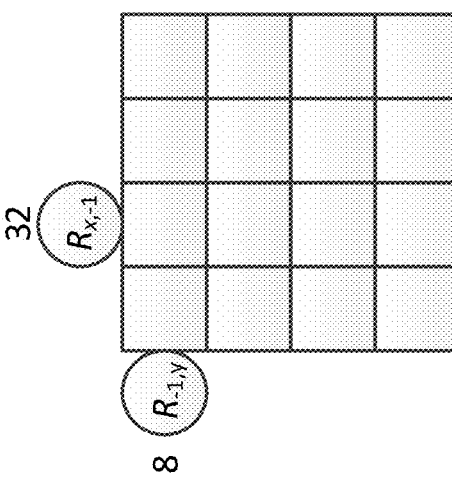
Figure 15:
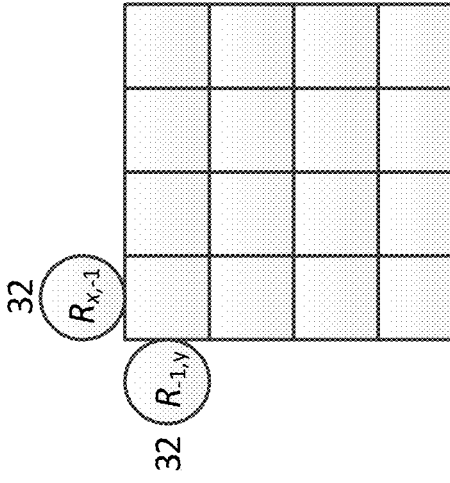
Figure 16:
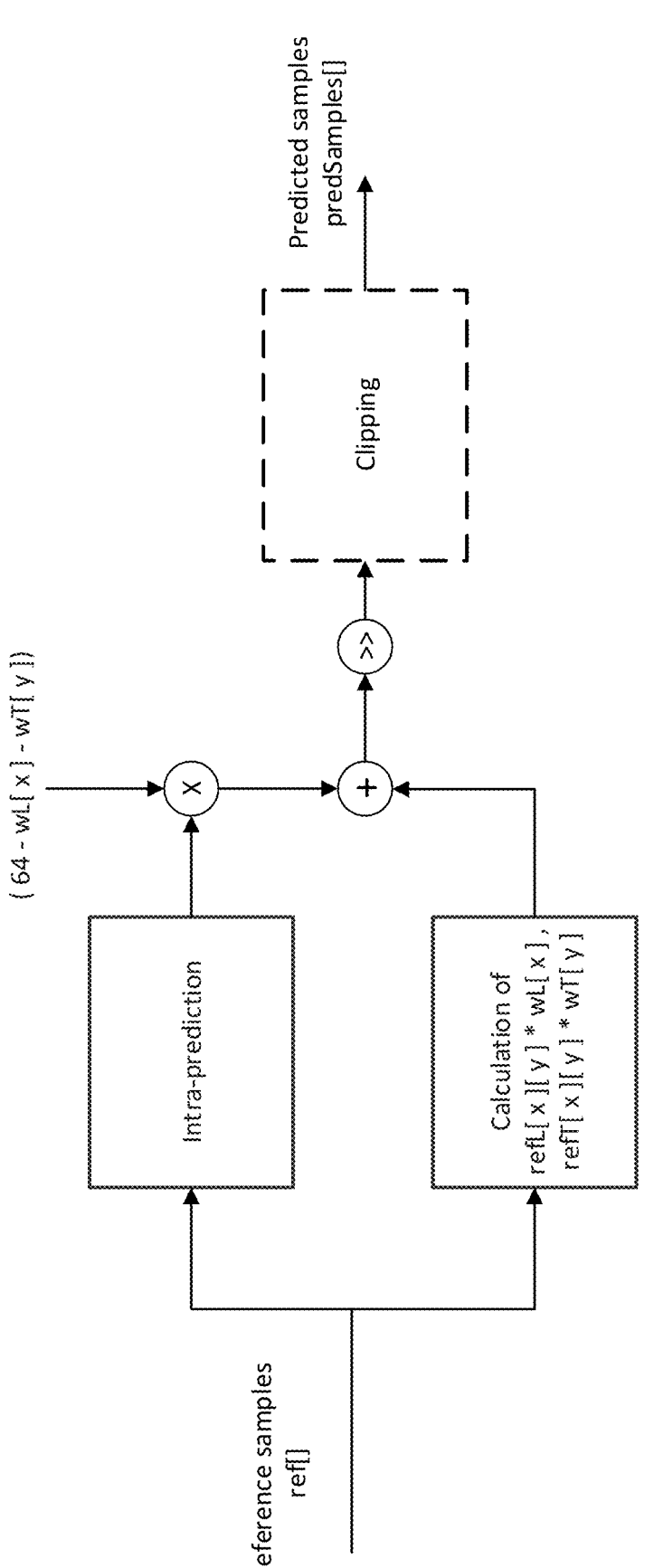
Figure 17:
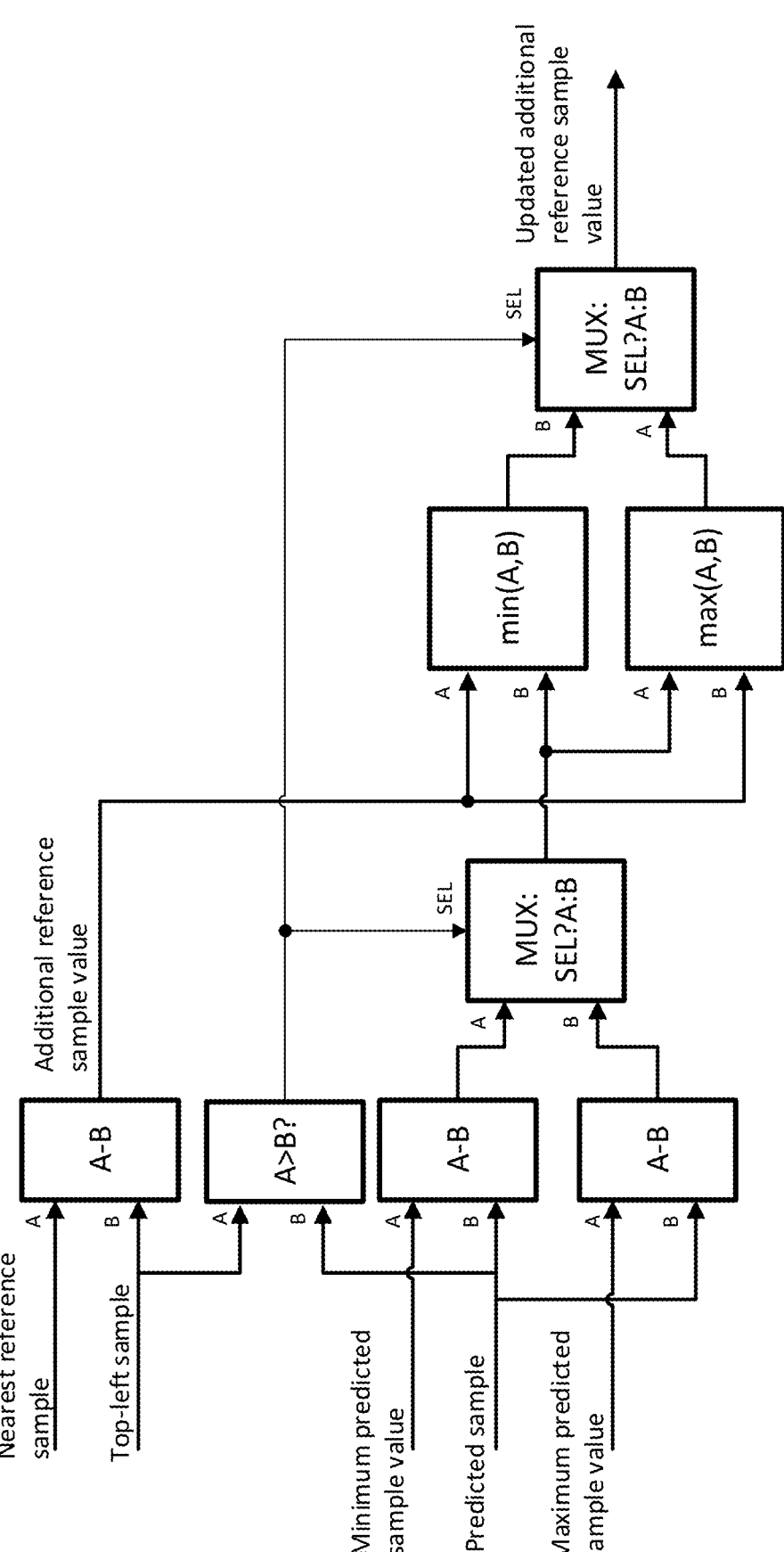
Figure 18:
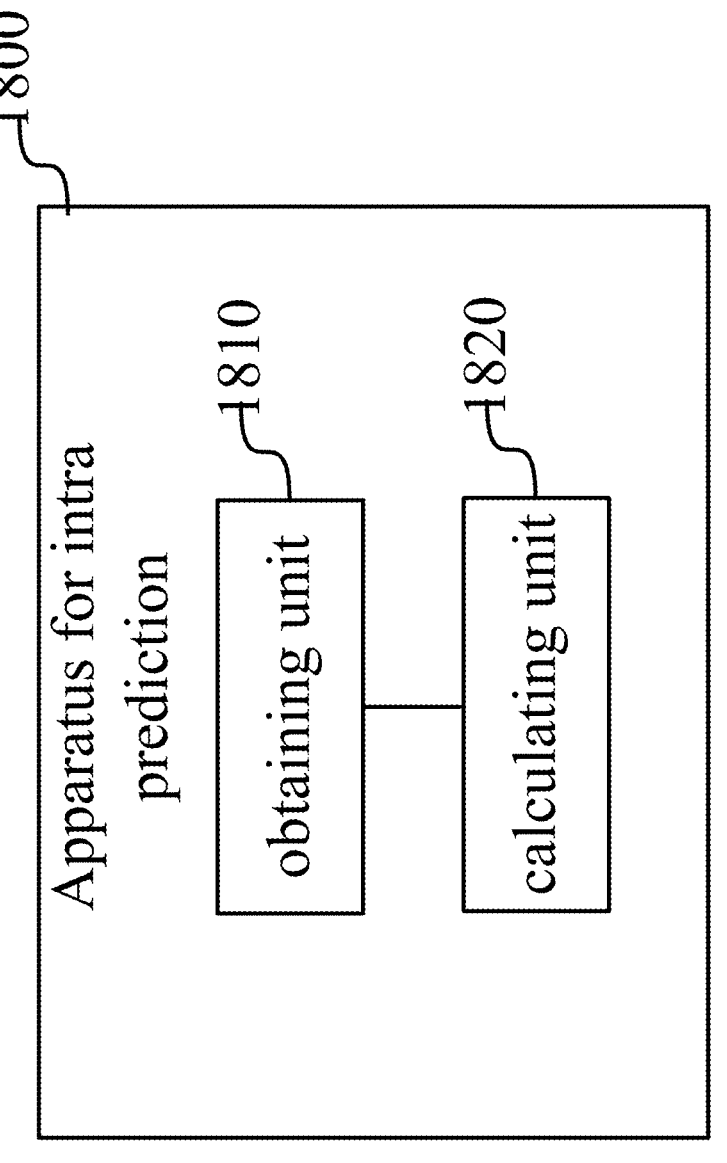
Figure 19:
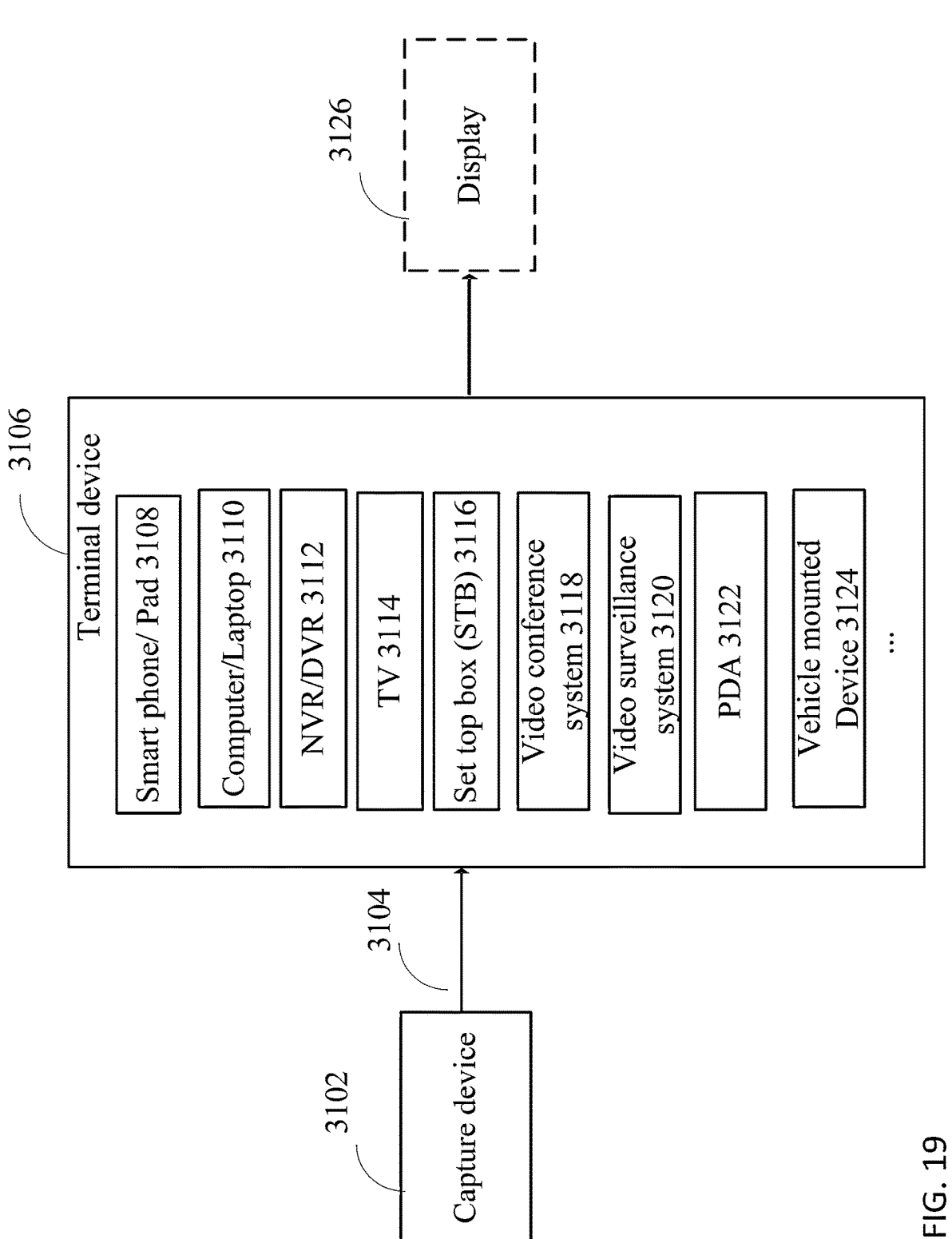
Figure 20:
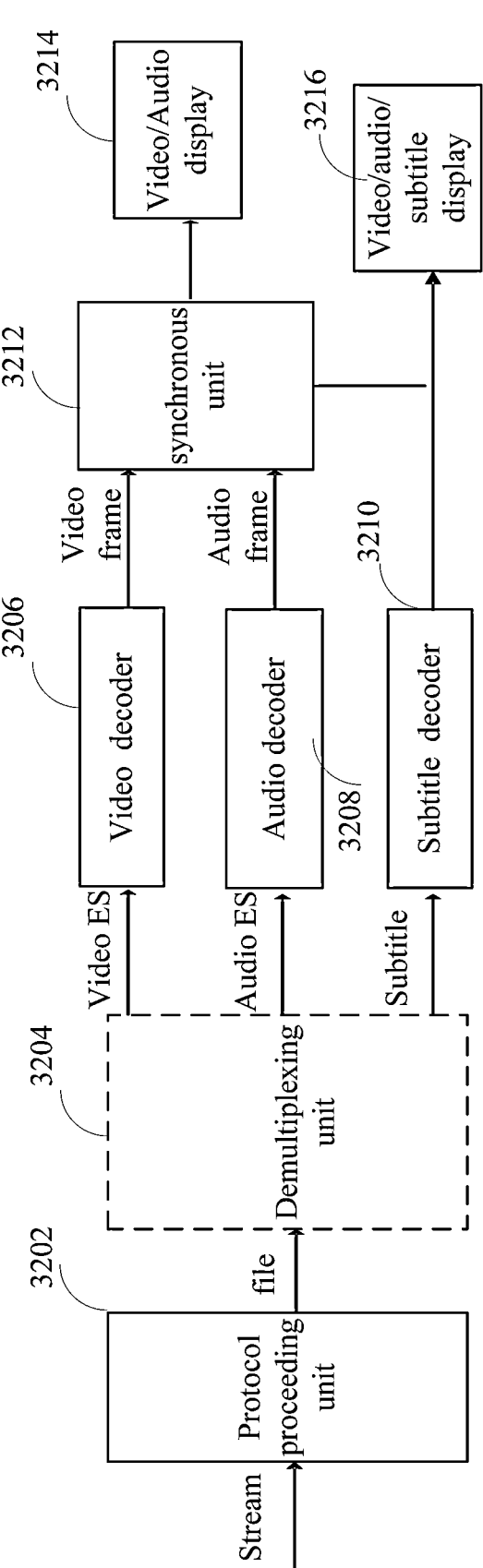

FIG. 6 illustrates an example of Angular intra prediction directions and modes and the associated value of $p_{ang}$ for vertical prediction directions;

FIG. 7 illustrates an example of Transformation of $p_{ref}$ to $p_{1,ref}$ for a 4×4 block;

FIG. 8 illustrates an example of Construction of $p_{1,ref}$ for horizontal angular prediction;

FIG. 9 illustrates an example of Construction of $p_{1,ref}$ for vertical angular prediction;

FIG. 10A illustrates an example of Angular intra prediction directions and the associated intra-prediction modes in JEM and BMS-1;

FIG. 10B illustrates an example of Angular intra prediction directions and the associated intra-prediction modes in VTM-2;

FIG. 10C illustrates an example of Angular intra prediction directions and the associated intra-prediction modes in VTM-3;

FIG. 11 illustrates an example of Angular intra prediction directions and the associated intra-prediction modes in HEVC;

FIG. 12 illustrates an example of QTBT explained;

FIG. 13A illustrates an example of coordinates for vertical and horizontal intra prediction modes;

FIG. 13B illustrates an example of DC mode PDPC weights for (0, 0) and (1, 0) positions inside a 4×4 block;

FIG. 14 illustrates an example of intra-predicting a block from reference samples of the main reference side;

FIG. 15 illustrates an example of DC mode PDPC weights for (0, 0) and (1, 0) positions inside a 4×4 block;

FIG. 16 illustrates an example of intra-predicting a block of samples;

FIG. 17 illustrates an example that reference samples are used by the intra prediction process to produce predicted samples;

FIG. 18 is a block diagram showing an example structure of an apparatus for intra prediction to produce predicted samples;

FIG. 19 is a block diagram showing an example structure of a content supply system 3100 which realizes a content delivery service; and FIG. 20 is a block diagram showing a structure of an example of a terminal device.

In the following identical reference signs refer to identical or at least functionally equivalent features if not explicitly specified otherwise.

DETAILED DESCRIPTION OF THE EMBODIMENTS

Definitions of Acronyms & Glossary
  JEM—Joint Exploration Model (the software codebase for future video coding exploration)
  JVET—Joint Video Experts Team
  LUT—Look-Up Table
  PDPC—Position-dependent prediction combination
  PPS—Picture parameter set
  QT—QuadTree
  QTBT—QuadTree plus Binary Tree
  RDO—Rate-distortion Optimization
  ROM—Read-Only Memory
  SPS—Sequence parameter set
  VTM—VVC Test Model
  VVC—Versatile Video Coding, the standardization project developed by JVET.
  CTU/CTB—Coding Tree Unit/Coding Tree Block
  CU/CB—Coding Unit/Coding Block

6

PU/PB—Prediction Unit/Prediction Block
  TU/TB—Transform Unit/Transform Block
  HEVC—High Efficiency Video Coding In the following description, reference is made to the accompanying figures, which form part of the disclosure, and which show, by way of illustration, specific aspects of embodiments of the invention or specific aspects in which embodiments of the present invention may be used. It is understood that embodiments of the invention may be used in other aspects and comprise structural or logical changes not depicted in the figures. The following detailed description, therefore, is not to be taken in a limiting sense, and the scope of the present invention is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g., functional units, to perform the described one or plurality of method steps (e.g., one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g., functional units, a corresponding method may include one step to perform the functionality of the one or plurality of units (e.g., one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term "picture" the term "frame" or "image" may be used as synonyms in the field of video coding. Video coding (or coding in general) comprises two parts, i.e. video encoding and video decoding. Video encoding is performed at the source side, typically comprising processing (e.g., by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC (Coding and Decoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g., by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g., by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g., intra- and inter predictions) and/or re-constructions for processing, i.e. coding, the subsequent blocks.

In the following embodiments of a video coding system 10, a video encoder 20 and a video decoder 30 are described based on FIGS. 1 to 3.

Figure 1A:
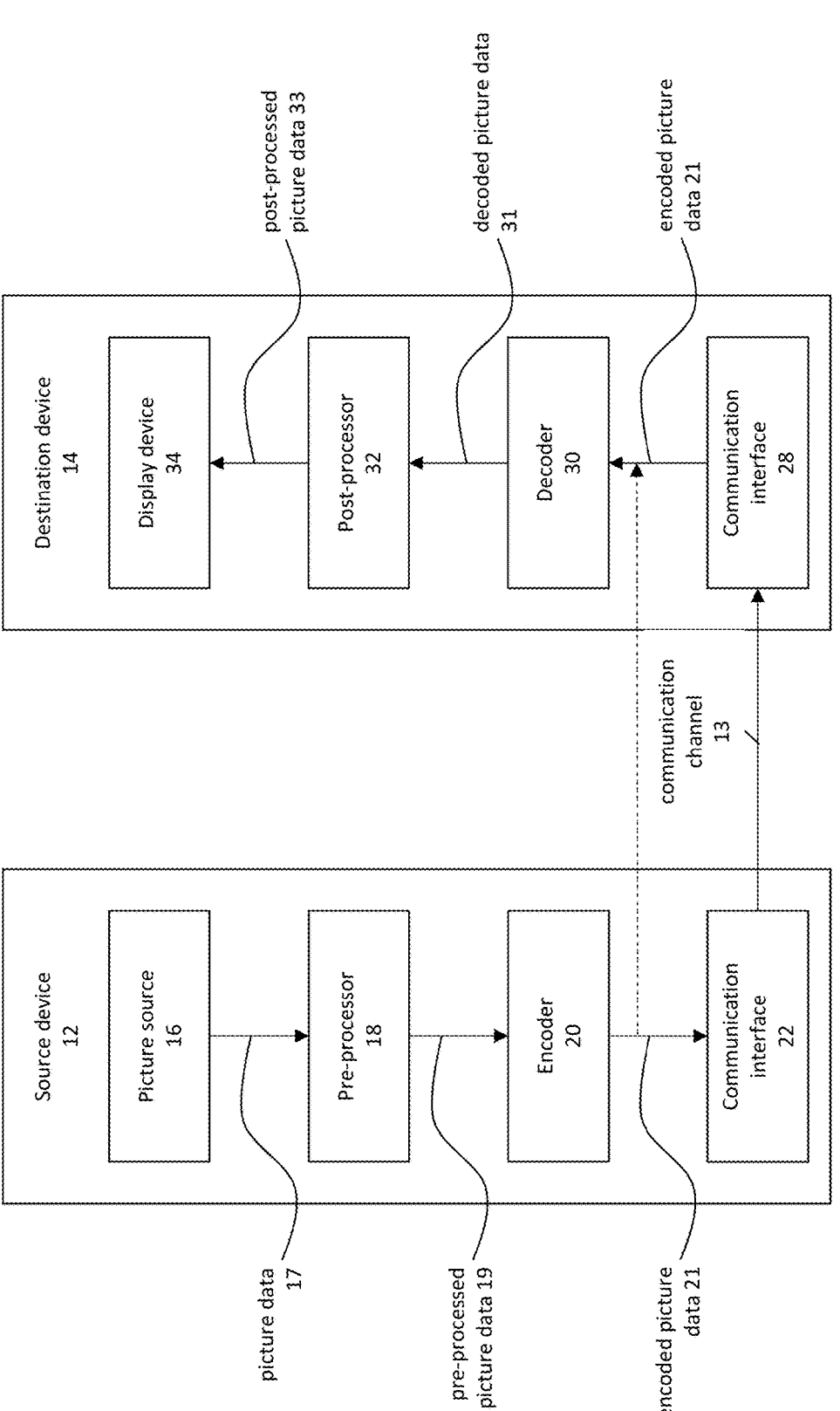
FIG. 1A is a block diagram showing an example of a video coding system configured to implement embodiments of the invention.

FIG. 1A is a schematic block diagram illustrating an example coding system 10, e.g., a video coding system 10 (or short coding system 10) that may utilize techniques of this present application. Video encoder 20 (or short encoder 20) and video decoder 30 (or short decoder 30) of video coding system 10 represent examples of devices that may be configured to perform techniques in accordance with various examples described in the present application.

As shown in FIG. 1A, the coding system 10 comprises a source device 12 configured to provide encoded picture data 21 e.g., to a destination device 14 for decoding the encoded picture data 21.

The source device 12 comprises an encoder 20, and may additionally, i.e. optionally, comprise a picture source 16, a pre-processor (or pre-processing unit) 18, e.g., a picture pre-processor 18, and a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g., a screen content, a virtual reality (VR) picture) and/or any combination thereof (e.g., an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g., from RGB to YCbCr), color correction, or de-noising. It can be understood that the pre-processing unit 18 may be optional component.

The video encoder 20 is configured to receive the pre-processed picture data 19 and provide encoded picture data 21 (further details will be described below, e.g., based on FIG. 2).

Communication interface 22 of the source device 12 may be configured to receive the encoded picture data 21 and to transmit the encoded picture data 21 (or any further processed version thereof) over communication channel 13 to another device, e.g., the destination device 14 or any other device, for storage or direct reconstruction.

The destination device 14 comprises a decoder 30 (e.g., a video decoder 30), and may additionally, i.e. optionally, comprise a communication interface or communication unit 28, a post-processor 32 (or post-processing unit 32) and a display device 34.

The communication interface 28 of the destination device 14 is configured receive the encoded picture data 21 (or any further processed version thereof), e.g., directly from the source device 12 or from any other source, e.g., a storage device, e.g., an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g., a direct wired or wireless connection, or via any kind of network, e.g., a wired or wireless network or any combination thereof, or any kind of private and public network, or any kind of combination thereof.

The communication interface 22 may be, e.g., configured to package the encoded picture data 21 into an appropriate format, e.g., packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 1A pointing from the source device 12 to the destination device 14, or bi-directional communication interfaces, and may be configured, e.g., to send and receive messages, e.g., to set up a connection, to acknowledge and exchange any other information related to the communication link and/or data transmission, e.g., encoded picture data transmission.

The decoder 30 is configured to receive the encoded picture data 21 and provide decoded picture data 31 or a decoded picture 31 (further details will be described below, e.g., based on FIG. 3 or FIG. 5).

The post-processor 32 of destination device 14 is configured to post-process the decoded picture data 31 (also called reconstructed picture data), e.g., the decoded picture 31, to obtain post-processed picture data 33, e.g., a post-processed picture 33. The post-processing performed by the post-processing unit 32 may comprise, e.g., color format conversion (e.g., from YCbCr to RGB), color correction, trimming, or re-sampling, or any other processing, e.g., for preparing the decoded picture data 31 for display, e.g., by display device 34.

The display device 34 of the destination device 14 is configured to receive the post-processed picture data 33 for displaying the picture, e.g., to a user or viewer. The display device 34 may be or comprise any kind of display for representing the reconstructed picture, e.g., an integrated or external display or monitor. The displays may, e.g., comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
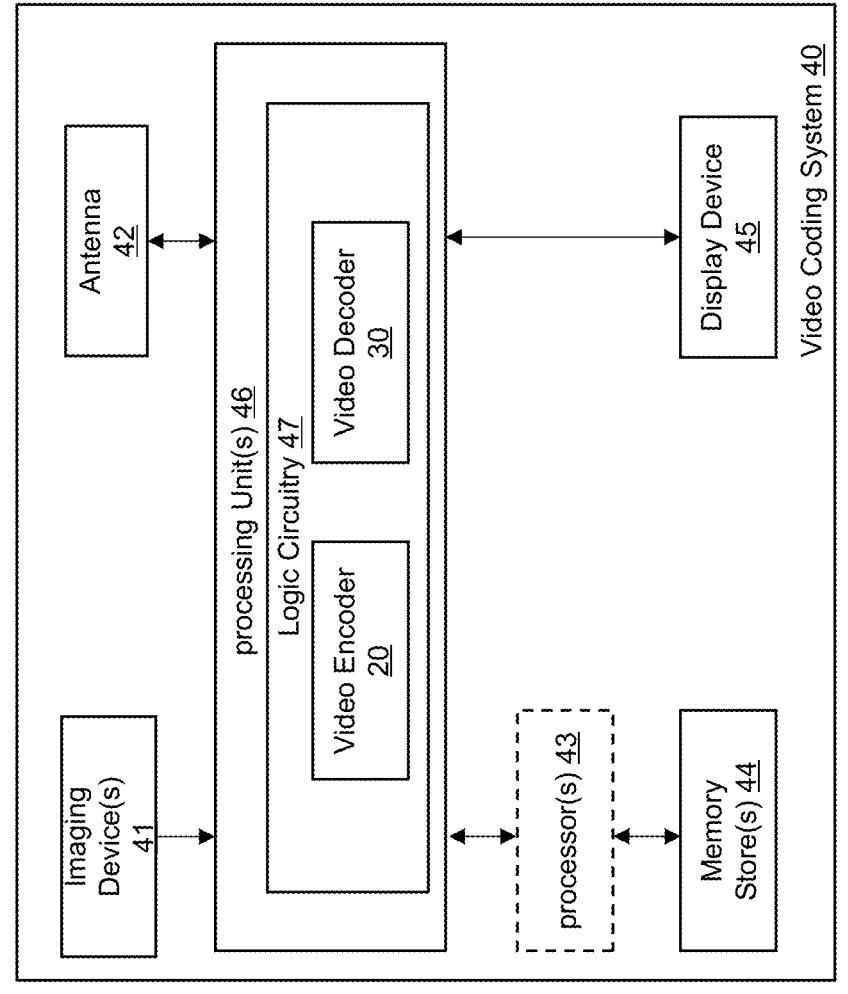
FIG. 1B is a block diagram showing another example of a video coding system configured to implement embodiments of the invention.

The encoder 20 (e.g., a video encoder 20) and the decoder 30 (e.g., a video decoder 30) each may be implemented as any of a variety of suitable circuitry as shown in FIG. 1B, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

Source device 12 and destination device 14 may comprise any of a wide range of devices, including any kind of handheld or stationary devices, e.g., notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

Figure 2:
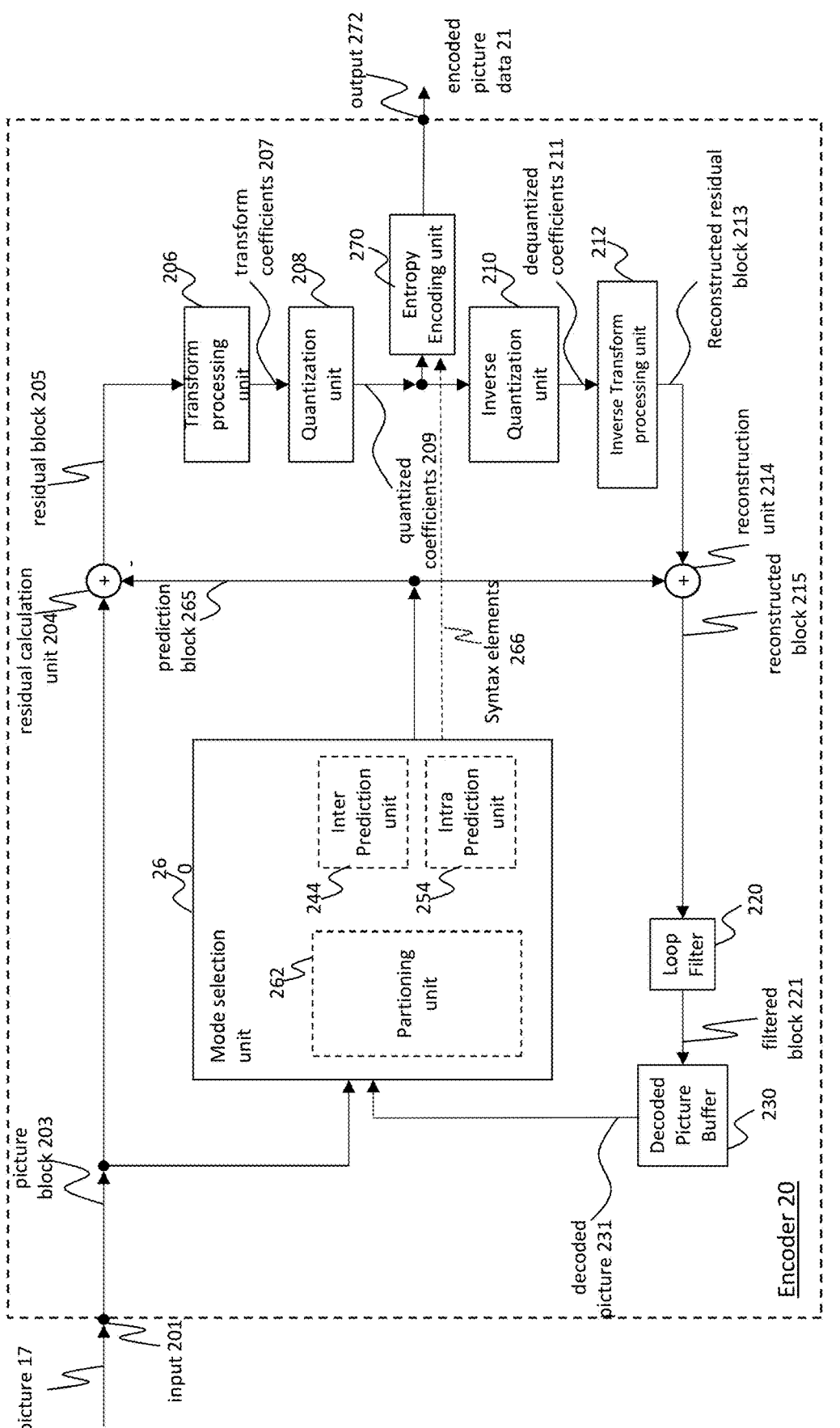
FIG. 2 is a block diagram showing an example of a video encoder configured to implement embodiments of the invention.
Figure 3:
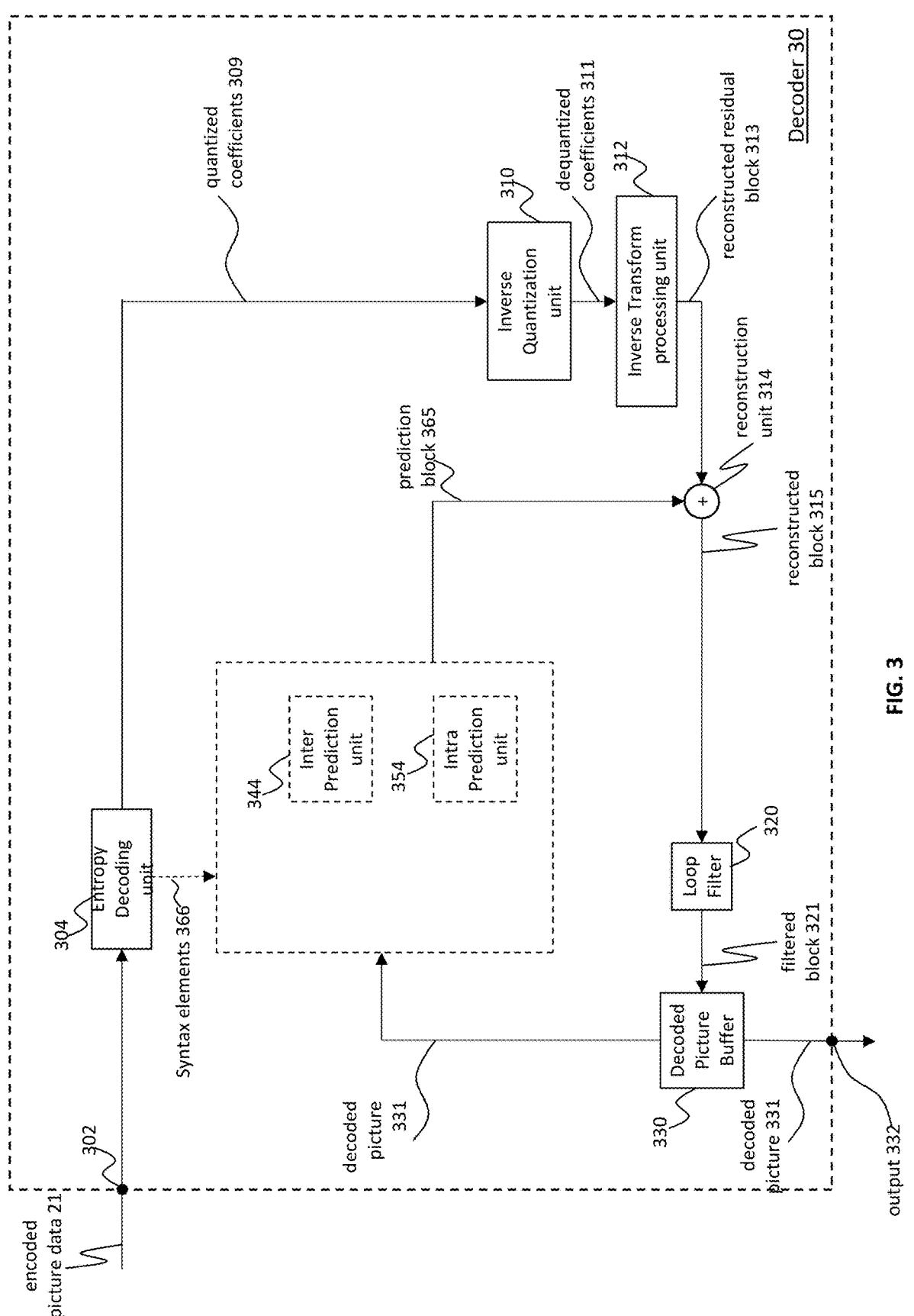
FIG. 3 is a block diagram showing an example structure of a video decoder configured to implement embodiments of the invention.

FIG. 1B is an illustrative diagram of another example video coding system 40 including encoder 20 of FIG. 2 and/or decoder 30 of FIG. 3 according to an exemplary embodiment. The system 40 can implement techniques in accordance with various examples described in the present application. In the illustrated implementation, video coding system 40 may include imaging device(s) 41, video encoder 100, video decoder 30 (and/or a video coder implemented via logic circuitry 47 of processing unit(s) 46), an antenna 42, one or more processor(s) 43, one or more memory store(s) 44, and/or a display device 45.

As illustrated, imaging device(s) 41, antenna 42, processing unit(s) 46, logic circuitry 47, video encoder 20, video decoder 30, processor(s) 43, memory store(s) 44, and/or display device 45 may be capable of communication with one another. As discussed, although illustrated with both video encoder 20 and video decoder 30, video coding system 40 may include only video encoder 20 or only video decoder 30 in various examples.

As shown, in some examples, video coding system 40 may include antenna 42. Antenna 42 may be configured to transmit or receive an encoded bitstream of video data, for example. Further, in some examples, video coding system 40 may include display device 45. Display device 45 may be configured to present video data. As shown, in some examples, logic circuitry 47 may be implemented via processing unit(s) 46. Processing unit(s) 46 may include application-specific integrated circuit (ASIC) logic, graphics processor(s), general purpose processor(s), or the like. Video coding system 40 also may include optional processor(s) 43, which may similarly include application-specific integrated circuit (ASIC) logic, graphics processor(s), general purpose processor(s), or the like. In some examples, logic circuitry 47 may be implemented via hardware, video coding dedicated hardware, or the like, and processor(s) 43 may implemented general purpose software, operating systems, or the like. In addition, memory store(s) 44 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory store(s) 44 may be implemented by cache memory. In some examples, logic circuitry 47 may access memory store(s) 44 (for implementation of an image buffer for example). In other examples, logic circuitry 47 and/or processing unit(s) 46 may include memory stores (e.g., cache or the like) for the implementation of an image buffer or the like.

In some examples, video encoder 20 implemented via logic circuitry may include an image buffer (e.g., via either processing unit(s) 46 or memory store(s) 44)) and a graphics processing unit (e.g., via processing unit(s) 46). The graphics processing unit may be communicatively coupled to the image buffer. The graphics processing unit may include video encoder 20 as implemented via logic circuitry 47 to embody the various modules as discussed with respect to FIG. 2 and/or any other encoder system or subsystem described herein. The logic circuitry may be configured to perform the various operations as discussed herein.

Video decoder 30 may be implemented in a similar manner as implemented via logic circuitry 47 to embody the various modules as discussed with respect to decoder 30 of FIG. 3 and/or any other decoder system or subsystem described herein. In some examples, video decoder 30 implemented via logic circuitry may include an image buffer (e.g., via either processing unit(s) 46 or memory store(s) 44)) and a graphics processing unit (e.g., via processing unit(s) 46). The graphics processing unit may be communicatively coupled to the image buffer. The graphics processing unit may include video decoder 30 as implemented via logic circuitry 47 to embody the various modules as discussed with respect to FIG. 3 and/or any other decoder system or subsystem described herein.

In some examples, antenna 42 of video coding system 40 may be configured to receive an encoded bitstream of video data. As discussed, the encoded bitstream may include data, indicators, index values, mode selection data, or the like associated with encoding a video frame as discussed herein, such as data associated with the coding partition (e.g., transform coefficients or quantized transform coefficients, optional indicators (as discussed), and/or data defining the coding partition). Video coding system 40 may also include video decoder 30 coupled to antenna 42 and configured to decode the encoded bitstream. The display device 45 configured to present video frames.

For convenience of description, embodiments of the invention are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the invention are not limited to HEVC or VVC.

Encoder and Encoding Method

FIG. 2 shows a schematic block diagram of an example video encoder 20 that is configured to implement the techniques of the present application. In the example of FIG. 2, the video encoder 20 comprises an input 201 (or input interface 201), a residual calculation unit 204, a transform processing unit 206, a quantization unit 208, an inverse quantization unit 210, and inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254 and a partitioning unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

The residual calculation unit 204, the transform processing unit 206, the quantization unit 208, the mode selection unit 260 may be referred to as forming a forward signal path of the encoder 20, whereas the inverse quantization unit 210, the inverse transform processing unit 212, the reconstruction unit 214, the buffer 216, the loop filter 220, the decoded picture buffer (DPB) 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the decoded picture buffer (DPB) 230, the inter prediction unit 244 and the intra-prediction unit 254 are also referred to forming the "built-in decoder" of video encoder 20.

Pictures & Picture Partitioning (Pictures & Blocks)

The encoder 20 may be configured to receive, e.g., via input 201, a picture 17 (or picture data 17), e.g., picture of a sequence of pictures forming a video or video sequence. The received picture or picture data may also be a pre-processed picture 19 (or pre-processed picture data 19). For sake of simplicity the following description refers to the picture 17. The picture 17 may also be referred to as current picture or picture to be coded (in particular in video coding to distinguish the current picture from other pictures, e.g., previously encoded and/or decoded pictures of the same video sequence, i.e. the video sequence which also comprises the current picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RGB format or color space a picture comprises a corresponding red, green and blue sample array. However, in video coding each pixel is typically represented in a luminance and chrominance format or color space, e.g., YCbCr, which comprises a luminance component indicated by Y (sometimes also L is used instead) and two chrominance components indicated by Cb and Cr. The luminance (or short luma) component Y represents the brightness or grey level intensity (e.g., like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 color format.

Embodiments of the video encoder 20 may comprise a picture partitioning unit (not depicted in FIG. 2) configured to partition the picture 17 into a plurality of (typically non-overlapping) picture blocks 203. These blocks may also be referred to as root blocks, macro blocks (H.264/AVC) or coding tree blocks (CTB) or coding tree units (CTU) (H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 17, e.g., one, several or all blocks forming the picture 17. The picture block 203 may also be referred to as current picture block or picture block to be coded.

Like the picture 17, the picture block 203 again is or can be regarded as a two-dimensional array or matrix of samples with intensity values (sample values), although of smaller dimension than the picture 17. In other words, the block 203 may comprise, e.g., one sample array (e.g., a luma array in case of a monochrome picture 17, or a luma or chroma array in case of a color picture) or three sample arrays (e.g., a luma and two chroma arrays in case of a color picture 17) or any other number and/or kind of arrays depending on the color format applied. The number of samples in horizontal and vertical direction (or axis) of the block 203 define the size of block 203. Accordingly, a block may, for example, an M×N (M-column by N-row) array of samples, or an M×N array of transform coefficients.

Embodiments of the video encoder 20 as shown in FIG. 2 may be configured encode the picture 17 block by block, e.g., the encoding and prediction is performed per block 203.
Residual Calculation The residual calculation unit 204 may be configured to calculate a residual block 205 (also referred to as residual 205) based on the picture block 203 and a prediction block 265 (further details about the prediction block 265 are provided later), e.g., by subtracting sample values of the prediction block 265 from sample values of the picture block 203, sample by sample (pixel by pixel) to obtain the residual block 205 in the sample domain.
Transform The transform processing unit 206 may be configured to apply a transform, e.g., a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, bit depth of the transform coefficients, tradeoff between accuracy and implementation costs, etc. Specific scaling factors are, for example, specified for the inverse transform, e.g., by inverse transform processing unit 212 (and the corresponding inverse transform, e.g., by inverse transform processing unit 312 at video decoder 30) and corresponding scaling factors for the forward transform, e.g., by transform processing unit 206, at an encoder 20 may be specified accordingly.

Embodiments of the video encoder 20 (respectively transform processing unit 206) may be configured to output transform parameters, e.g., a type of transform or transforms, e.g., directly or encoded or compressed via the entropy encoding unit 270, so that, e.g., the video decoder 30 may receive and use the transform parameters for decoding.
Quantization The quantization unit 208 may be configured to quantize the transform coefficients 207 to obtain quantized coefficients 209, e.g., by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit Transform coefficient during quantization, where n is greater than m. The degree of quantization may be modified by adjusting a quantization parameter (QP). For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and a corresponding inverse quantization, e.g., by inverse quantization unit 210, may include multiplication by the quantization step size. Embodiments according to some standards, e.g., HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g., in a bitstream. The quantization is a lossy operation, wherein the loss increases with increasing quantization step sizes.

Embodiments of the video encoder 20 (respectively quantization unit 208) may be configured to output quantization parameters (QP), e.g., directly or encoded via the entropy encoding unit 270, so that, e.g., the video decoder 30 may receive and apply the quantization parameters for decoding.
Inverse Quantization The inverse quantization unit 210 is configured to apply the inverse quantization of the quantization unit 208 on the quantized coefficients to obtain dequantized coefficients 211, e.g., by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.
Inverse Transform The inverse transform processing unit 212 is configured to apply the inverse transform of the transform applied by the transform processing unit 206, e.g., an inverse discrete cosine transform (DCT) or inverse discrete sine transform (DST) or other inverse transforms, to obtain a reconstructed residual block 213 (or corresponding dequantized coefficients 213) in the sample domain. The reconstructed residual block 213 may also be referred to as transform block 213.
Reconstruction The reconstruction unit 214 (e.g., adder or summer 214) is configured to add the transform block 213 (i.e. reconstructed residual block 213) to the prediction block 265 to obtain a reconstructed block 215 in the sample domain, e.g., by adding—sample by sample—the sample values of the reconstructed residual block 213 and the sample values of the prediction block 265.
Filtering The loop filter unit 220 (or short "loop filter" 220), is configured to filter the reconstructed block 215 to obtain a filtered block 221, or in general, to filter reconstructed samples to obtain filtered samples. The loop filter unit is, e.g., configured to smooth pixel transitions, or otherwise improve the video quality. The loop filter unit 220 may comprise one or more loop filters such as a de-blocking filter, a sample-adaptive offset (SAO) filter or one or more other filters, e.g., a bilateral filter, an adaptive loop filter (ALF), a sharpening, a smoothing filters or a collaborative filters, or any combination thereof. Although the loop filter unit 220 is shown in FIG. 2 as being an in loop filter, in other configurations, the loop filter unit 220 may be implemented as a post loop filter. The filtered block 221 may also be referred to as filtered reconstructed block 221. Decoded picture buffer 230 may store the reconstructed coding blocks after the loop filter unit 220 performs the filtering operations on the reconstructed coding blocks.

Embodiments of the video encoder 20 (respectively loop filter unit 220) may be configured to output loop filter parameters (such as sample adaptive offset information), e.g., directly or encoded via the entropy encoding unit 270, so that, e.g., a decoder 30 may receive and apply the same loop filter parameters or respective loop filters for decoding.

Decoded Picture Buffer

The decoded picture buffer (DPB) 230 may be a memory that stores reference pictures, or in general reference picture data, for encoding video data by video encoder 20. The DPB 230 may be formed by any of a variety of memory devices, such as dynamic random access memory (DRAM), including synchronous DRAM (SDRAM), magnetoresistive RAM (MRAM), resistive RAM (RRAM), or other types of memory devices. The decoded picture buffer (DPB) 230 may be configured to store one or more filtered blocks 221. The decoded picture buffer 230 may be further configured to store other previously filtered blocks, e.g., previously reconstructed and filtered blocks 221, of the same current picture or of different pictures, e.g., previously reconstructed pictures, and may provide complete previously reconstructed, i.e. decoded, pictures (and corresponding reference blocks and samples) and/or a partially reconstructed current picture (and corresponding reference blocks and samples), for example for inter prediction. The decoded picture buffer (DPB) 230 may be also configured to store one or more unfiltered reconstructed blocks 215, or in general unfiltered reconstructed samples, e.g., if the reconstructed block 215 is not filtered by loop filter unit 220, or any other further processed version of the reconstructed blocks or samples.

Mode Selection (Partitioning & Prediction)

The mode selection unit 260 comprises partitioning unit 262, inter-prediction unit 244 and intra-prediction unit 254, and is configured to receive or obtain original picture data, e.g., an original block 203 (current block 203 of the current picture 17), and reconstructed picture data, e.g., filtered and/or unfiltered reconstructed samples or blocks of the same (current) picture and/or from one or a plurality of previously decoded pictures, e.g., from decoded picture buffer 230 or other buffers (e.g., line buffer, not shown). The reconstructed picture data is used as reference picture data for prediction, e.g., inter-prediction or intra-prediction, to obtain a prediction block 265 or predictor 265.

Mode selection unit 260 may be configured to determine or select a partitioning for a current block prediction mode (including no partitioning) and a prediction mode (e.g., an intra or inter prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g., from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e. select the prediction mode which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition the block 203 into smaller block partitions or sub-blocks (which form again blocks), e.g., iteratively using quad-tree-partitioning (QT), binary partitioning (BT) or triple-tree-partitioning (TT) or any combination thereof, and to perform, e.g., the prediction for each of the block partitions or sub-blocks, wherein the mode selection comprises the selection of the tree-structure of the partitioned block 203 and the prediction modes are applied to each of the block partitions or sub-blocks.

In the following the partitioning (e.g., by partitioning unit 260) and prediction processing (by inter-prediction unit 244 and intra-prediction unit 254) performed by an example video encoder 20 will be explained in more detail.

Partitioning

The partitioning unit 262 may partition (or split) a current block 203 into smaller partitions, e.g., smaller blocks of square or rectangular size. These smaller blocks (which may also be referred to as sub-blocks) may be further partitioned into even smaller partitions. This is also referred to tree-partitioning or hierarchical tree-partitioning, wherein a root block, e.g., at root tree-level 0 (hierarchy-level 0, depth 0), may be recursively partitioned, e.g., partitioned into two or more blocks of a next lower tree-level, e.g., nodes at tree-level 1 (hierarchy-level 1, depth 1), wherein these blocks may be again partitioned into two or more blocks of a next lower level, e.g., tree-level 2 (hierarchy-level 2, depth 2), etc. until the partitioning is terminated, e.g., because a termination criterion is fulfilled, e.g., a maximum tree depth or minimum block size is reached. Blocks which are not further partitioned are also referred to as leaf-blocks or leaf nodes of the tree. A tree using partitioning into two partitions is referred to as binary-tree (BT), a tree using partitioning into three partitions is referred to as ternary-tree (TT), and a tree using partitioning into four partitions is referred to as quad-tree (QT).

As mentioned before, the term "block" as used herein may be a portion, in particular a square or rectangular portion, of a picture. With reference, for example, to HEVC and VVC, the block may be or correspond to a coding tree unit (CTU), a coding unit (CU), prediction unit (PU), and transform unit (TU) and/or to the corresponding blocks, e.g., a coding tree block (CTB), a coding block (CB), a transform block (TB) or prediction block (PB).

For example, a coding tree unit (CTU) may be or comprise a CTB of luma samples, two corresponding CTBs of chroma samples of a picture that has three sample arrays, or a CTB of samples of a monochrome picture or a picture that is coded using three separate colour planes and syntax structures used to code the samples. Correspondingly, a coding tree block (CTB) may be an N×N block of samples for some value of N such that the division of a component into CTBs is a partitioning. A coding unit (CU) may be or comprise a coding block of luma samples, two corresponding coding blocks of chroma samples of a picture that has three sample arrays, or a coding block of samples of a monochrome picture or a picture that is coded using three separate color planes and syntax structures used to code the samples. Correspondingly a coding block (CB) may be an M×N block of samples for some values of M and N such that the division of a CTB into coding blocks is a partitioning.

In embodiments, e.g., according to HEVC, a coding tree unit (CTU) may be split into CUs by using a quad-tree structure denoted as coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU.

In embodiments, e.g., according to the latest video coding standard currently in development, which is referred to as Versatile Video Coding (VVC), Quad-tree and binary tree (QTBT) partitioning is used to partition a coding block. In the QTBT block structure, a CU can have either a square or rectangular shape. For example, a coding tree unit (CTU) is first partitioned by a quadtree structure. The quadtree leaf nodes are further partitioned by a binary tree or ternary (or triple) tree structure. The partitioning tree leaf nodes are called coding units (CUs), and that segmentation is used for prediction and transform processing without any further partitioning. This means that the CU, PU and TU have the same block size in the QTBT coding block structure. In parallel, multiple partition, for example, triple tree partition was also proposed to be used together with the QTBT block structure.

In one example, the mode selection unit 260 of video encoder 20 may be configured to perform any combination of the partitioning techniques described herein.

As described above, the video encoder 20 is configured to determine or select the best or an optimum prediction mode from a set of (pre-determined) prediction modes. The set of prediction modes may comprise, e.g., intra-prediction modes and/or inter-prediction modes.

Intra-Prediction

The set of intra-prediction modes may comprise 35 different intra-prediction modes, e.g., non-directional modes like DC (or mean) mode and planar mode, or directional modes, e.g., as defined in HEVC, or may comprise 67 different intra-prediction modes, e.g., non-directional modes like DC (or mean) mode and planar mode, or directional modes, e.g., as defined for VVC.

The intra-prediction unit 254 is configured to use reconstructed samples of neighboring blocks of the same current picture to generate an intra-prediction block 265 according to an intra-prediction mode of the set of intra-prediction modes.

The intra prediction unit 254 (or in general the mode selection unit 260) is further configured to output intra-prediction parameters (or in general information indicative of the selected intra prediction mode for the block) to the entropy encoding unit 270 in form of syntax elements 266 for inclusion into the encoded picture data 21, so that, e.g., the video decoder 30 may receive and use the prediction parameters for decoding.

Inter-Prediction

The set of (or possible) inter-prediction modes depends on the available reference pictures (i.e. previous at least partially decoded pictures, e.g., stored in DPB 230) and other inter-prediction parameters, e.g., whether the whole reference picture or only a part, e.g., a search window area around the area of the current block, of the reference picture is used for searching for a best matching reference block, and/or e.g., whether pixel interpolation is applied, e.g., half/semi-pel and/or quarter-pel interpolation, or not.

Additional to the above prediction modes, skip mode and/or direct mode may be applied.

The inter prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or a plurality of previously reconstructed blocks, e.g., reconstructed blocks of one or a plurality of other/different previously decoded pictures 231, for motion estimation. E.g., a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter prediction parameters to the motion estimation unit. This offset is also called motion vector (MV).

The motion compensation unit is configured to obtain, e.g., receive, an inter prediction parameter and to perform inter prediction based on or using the inter prediction parameter to obtain an inter prediction block 265. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists.

Motion compensation unit may also generate syntax elements associated with the blocks and the video slice for use by video decoder 30 in decoding the picture blocks of the video slice.

Entropy Coding

The entropy encoding unit 270 is configured to apply, for example, an entropy encoding algorithm or scheme (e.g., a variable length coding (VLC) scheme, an context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding or another entropy encoding methodology or technique) or bypass (no compression) on the quantized coefficients 209, inter prediction parameters, intra prediction parameters, loop filter parameters and/or other syntax elements to obtain encoded picture data 21 which can be output via the output 272, e.g., in the form of an encoded bitstream 21, so that, e.g., the video decoder 30 may receive and use the parameters for decoding. The encoded bitstream 21 may be transmitted to video decoder 30, or stored in a memory for later transmission or retrieval by video decoder 30.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

Decoder and Decoding Method

FIG. 3 shows an example of a video decoder 30 that is configured to implement the techniques of this present application. The video decoder 30 is configured to receive encoded picture data 21 (e.g., encoded bitstream 21), e.g., encoded by encoder 20, to obtain a decoded picture 331. The encoded picture data or bitstream comprises information for decoding the encoded picture data, e.g., data that represents picture blocks of an encoded video slice and associated syntax elements.

In the example of FIG. 3, the decoder 30 comprises an entropy decoding unit 304, an inverse quantization unit 310, an inverse transform processing unit 312, a reconstruction unit 314 (e.g., a summer 314), a loop filter 320, a decoded picture buffer (DBP) 330, an inter prediction unit 344 and an intra prediction unit 354. Inter prediction unit 344 may be or include a motion compensation unit. Video decoder 30 may, in some examples, perform a decoding pass generally reciprocal to the encoding pass described with respect to video encoder 100 from FIG. 2.

As explained with regard to the encoder 20, the inverse quantization unit 210, the inverse transform processing unit 212, the reconstruction unit 214 the loop filter 220, the decoded picture buffer (DPB) 230, the inter prediction unit 344 and the intra prediction unit 354 are also referred to as forming the "built-in decoder" of video encoder 20. Accordingly, the inverse quantization unit 310 may be identical in function to the inverse quantization unit 110, the inverse transform processing unit 312 may be identical in function to the inverse transform processing unit 212, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video 20 encoder apply correspondingly to the respective units and functions of the video decoder 30.

Entropy Decoding

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters (not shown in FIG. 3), e.g., any or all of inter prediction parameters (e.g., reference picture index and motion vector), intra prediction parameter (e.g., intra prediction mode or index), transform parameters, quantization parameters, loop filter parameters, and/or other syntax elements. Entropy decoding unit 304 maybe configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode selection unit 360 and other parameters to other units of the decoder 30. Video decoder 30 may receive the syntax elements at the video slice level and/or the video block level.

Inverse Quantization

The inverse quantization unit 310 may be configured to receive quantization parameters (QP) (or in general information related to the inverse quantization) and quantized coefficients from the encoded picture data 21 (e.g., by parsing and/or decoding, e.g., by entropy decoding unit 304) and to apply based on the quantization parameters an inverse quantization on the decoded quantized coefficients 309 to obtain dequantized coefficients 311, which may also be referred to as transform coefficients 311. The inverse quantization process may include use of a quantization parameter determined by video encoder 20 for each video block in the video slice to determine a degree of quantization and, likewise, a degree of inverse quantization that should be applied.

Inverse Transform

Inverse transform processing unit 312 may be configured to receive dequantized coefficients 311, also referred to as transform coefficients 311, and to apply a transform to the dequantized coefficients 311 in order to obtain reconstructed residual blocks 213 in the sample domain. The reconstructed residual blocks 213 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g., by parsing and/or decoding, e.g., by entropy decoding unit 304) to determine the transform to be applied to the dequantized coefficients 311.

Reconstruction

The reconstruction unit 314 (e.g., adder or summer 314) may be configured to add the reconstructed residual block 313, to the prediction block 365 to obtain a reconstructed block 315 in the sample domain, e.g., by adding the sample values of the reconstructed residual block 313 and the sample values of the prediction block 365.

Filtering

The loop filter unit 320 (either in the coding loop or after the coding loop) is configured to filter the reconstructed block 315 to obtain a filtered block 321, e.g., to smooth pixel transitions, or otherwise improve the video quality. The loop filter unit 320 may comprise one or more loop filters such as a de-blocking filter, a sample-adaptive offset (SAO) filter or one or more other filters, e.g., a bilateral filter, an adaptive loop filter (ALF), a sharpening, a smoothing filters or a collaborative filters, or any combination thereof. Although the loop filter unit 320 is shown in FIG. 3 as being an in loop filter, in other configurations, the loop filter unit 320 may be implemented as a post loop filter.

Decoded Picture Buffer

The decoded video blocks 321 of a picture are then stored in decoded picture buffer 330, which stores the decoded pictures 331 as reference pictures for subsequent motion compensation for other pictures and/or for output respectively display.

The decoder 30 is configured to output the decoded picture 311, e.g., via output 312, for presentation or viewing to a user.

Prediction

The inter prediction unit 344 may be identical to the inter prediction unit 244 (in particular to the motion compensation unit) and the intra prediction unit 354 may be identical to the inter prediction unit 254 in function, and performs split or partitioning decisions and prediction based on the partitioning and/or prediction parameters or respective information received from the encoded picture data 21 (e.g., by parsing and/or decoding, e.g., by entropy decoding unit 304). Mode selection unit 360 may be configured to perform the prediction (intra or inter prediction) per block based on reconstructed pictures, blocks or respective samples (filtered or unfiltered) to obtain the prediction block 365.

When the video slice is coded as an intra coded (I) slice, intra prediction unit 354 of mode selection unit 360 is configured to generate prediction block 365 for a picture block of the current video slice based on a signaled intra prediction mode and data from previously decoded blocks of the current picture. When the video picture is coded as an inter coded (i.e., B, or P) slice, inter prediction unit 344 (e.g., motion compensation unit) of mode selection unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330.

Mode selection unit 360 is configured to determine the prediction information for a video block of the current video slice by parsing the motion vectors and other syntax elements, and uses the prediction information to produce the prediction blocks for the current video block being decoded. For example, the mode selection unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

Figure 4:
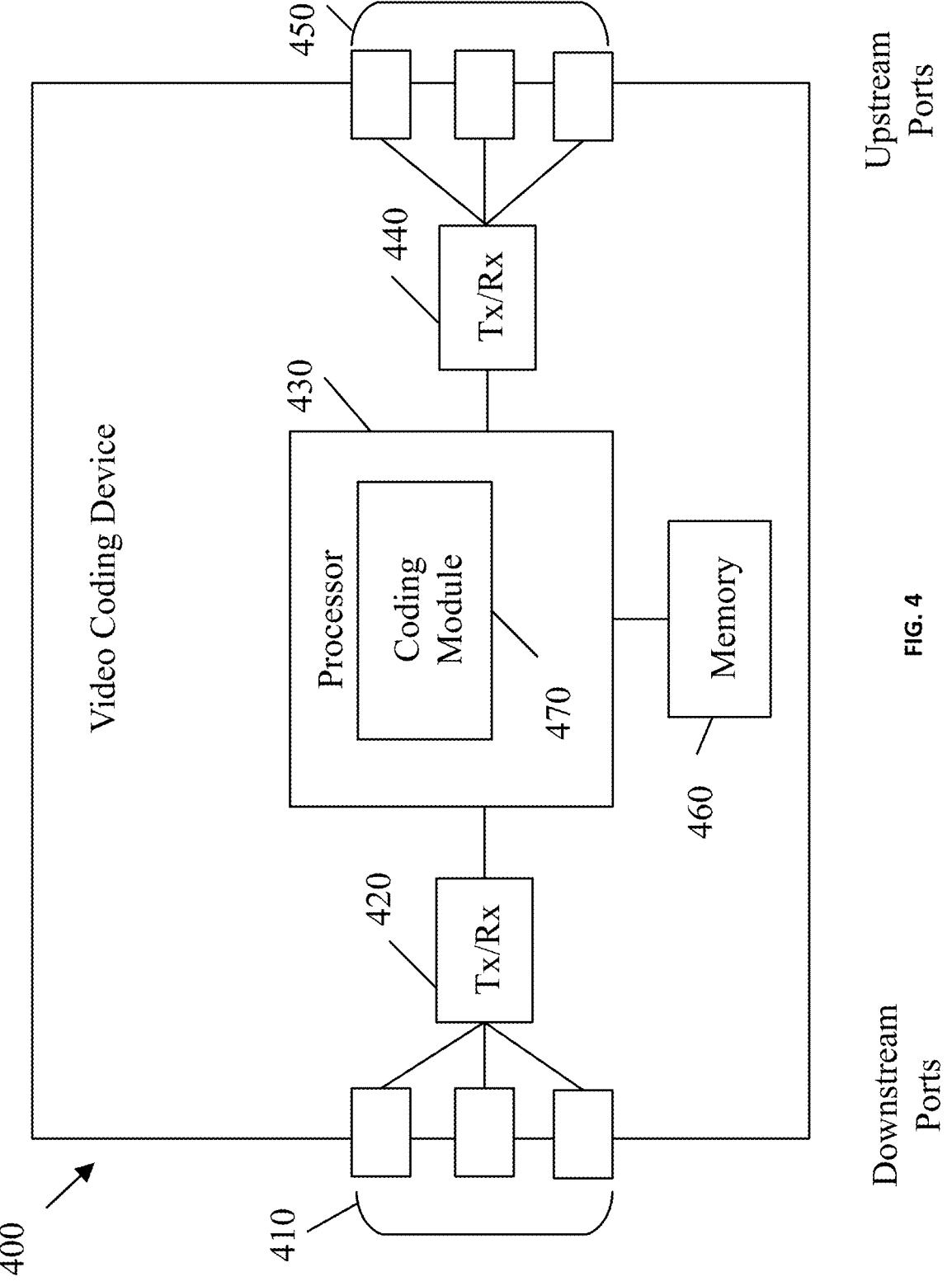
FIG. 4 is a block diagram illustrating an example of an encoding apparatus or a decoding apparatus.

FIG. 4 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A.

The video coding device 400 comprises ingress ports 410 (or input ports 410) and receiver units (Rx) 420 for receiving data; a processor, logic unit, or central processing unit (CPU) 430 to process the data; transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICS, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

Figure 5:
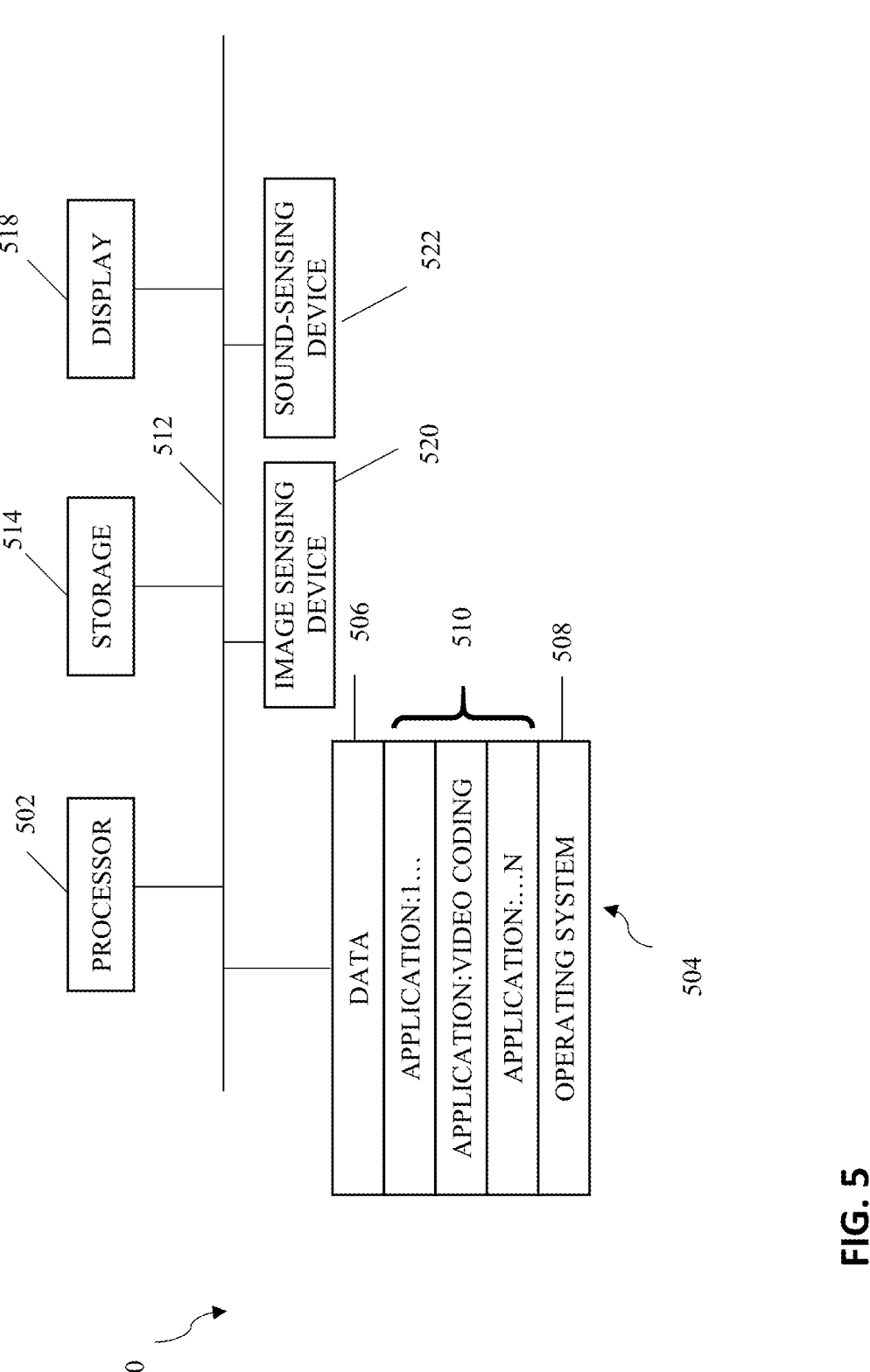
FIG. 5 is a block diagram illustrating another example of an encoding apparatus or a decoding apparatus.

FIG. 5 is a simplified block diagram of an apparatus 500 that may be used as either or both of the source device 12 and the destination device 14 from FIG. 1A according to an exemplary embodiment. The apparatus 500 can implement techniques of this present application described above. The apparatus 500 can be in the form of a computing system including multiple computing devices, or in the form of a single computing device, for example, a mobile phone, a tablet computer, a laptop computer, a notebook computer, a desktop computer, and the like.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here. The apparatus 500 can also include additional memory in the form of a secondary storage 514, which can, for example, be a memory card used with a mobile computing device. Because the video communication sessions may contain a significant amount of information, they can be stored in whole or in part in the secondary storage 514 and loaded into the memory 504 as needed for processing.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512. Other output devices that permit a user to program or otherwise use the apparatus 500 can be provided in addition to or as an alternative to the display 518. When the output device is or includes a display, the display can be implemented in various ways, including by a liquid crystal display (LCD), a cathode-ray tube (CRT) display, a plasma display or light emitting diode (LED) display, such as an organic LED (OLED) display.

The apparatus 500 can also include or be in communication with an image-sensing device 520, for example a camera, or any other image-sensing device 520 now existing or hereafter developed that can sense an image such as the image of a user operating the apparatus 500. The image-sensing device 520 can be positioned such that it is directed toward the user operating the apparatus 500. In an example, the position and optical axis of the image-sensing device 520 can be configured such that the field of vision includes an area that is directly adjacent to the display 518 and from which the display 518 is visible.

The apparatus 500 can also include or be in communication with a sound-sensing device 522, for example a microphone, or any other sound-sensing device now existing or hereafter developed that can sense sounds near the apparatus 500. The sound-sensing device 522 can be positioned such that it is directed toward the user operating the apparatus 500 and can be configured to receive sounds, for example, speech or other utterances, made by the user while the user operates the apparatus 500.

Although FIG. 5 depicts the processor 502 and the memory 504 of the apparatus 500 as being integrated into a single unit, other configurations can be utilized. The operations of the processor 502 can be distributed across multiple machines (each machine having one or more of processors) that can be coupled directly or across a local area or other network. The memory 504 can be distributed across multiple machines such as a network-based memory or memory in multiple machines performing the operations of the apparatus 500. Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

Video coding schemes such as H.264/AVC and HEVC are designed along the successful principle of block-based hybrid video coding. Using this principle a picture is first partitioned into blocks and then each block is predicted by using intra-picture or inter-picture prediction.

As used herein, the term "block" may a portion of a picture or a frame. For convenience of description, embodiments of the invention are described herein in reference to High-Efficiency Video Coding (HEVC) or the reference software of Versatile video coding (VVC), developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the invention are not limited to HEVC or VVC. It may refer to a CU, PU, and TU. In HEVC, a CTU is split into CUs by using a quad-tree structure denoted as coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU. In the newest development of the video compression technical, Quad-tree and binary tree (QTBT) partitioning is used to partition a coding block. In the QTBT block structure, a CU can have either a square or rectangular shape. For example, a coding tree unit (CTU) is first partitioned by a quadtree structure. The quadtree leaf nodes are further partitioned by a binary tree structure. The binary tree leaf nodes are called coding units (CUs), and that segmentation is used for prediction and transform processing without any further partitioning. This means that the CU, PU and TU have the same block size in the QTBT coding block structure. In parallel, multiple partition, for example, triple tree partition was also proposed to be used together with the QTBT block structure.

ITU-T VCEG (Q6/16) and ISO/IEC MPEG (JTC 1/SC 29/WG 11) are studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area.

For directional intra prediction, intra prediction modes are available representing different prediction angles from diagonal-up to diagonal-down. For definition of the prediction angles, an offset value $p_{ang}$ on a 32-sample grid is defined. The association of $p_{ang}$ to the corresponding intra prediction mode is visualized in FIG. 6 for the vertical prediction modes. For the horizontal prediction modes the scheme is flipped to vertical direction and the $p_{ang}$ values are assigned accordingly. As stated above, all angular prediction modes are available for all applicable intra prediction block sizes. They all use the same 32-sample grid for the definition of the prediction angles. The distribution of the $p_{ang}$ values over the 32-sample grid in FIG. 6 reveals an increased resolution of the prediction angles around the vertical direction and a coarser resolution of the prediction angles towards the diagonal directions. The same applies to the horizontal directions. This design stems from the observation that in lots of video content, approximately horizontal and vertical structures play an important role compared to diagonal structures.

While for the horizontal and vertical prediction directions, the selection of samples to be used for prediction is straightforward, this task requires more effort in case of angular prediction. For modes 11-25, when predicting the current block Bc from the set of prediction samples $p_{ref}$ (also known as main reference side) in an angular direction, samples of both, the vertical and the horizontal part of $p_{ref}$ can be involved. Since the determination of the location of the respective samples on either of the branches of $p_{ref}$ requires some computational effort, a unified one-dimensional prediction reference has been designed for HEVC intra prediction. The scheme is visualized in FIG. 7. Before performing the actual prediction operation, the set of reference samples $p_{ref}$ is mapped to a 1-dimensional vector $p_{1,ref}$. The projection which is used for the mapping depends on the direction indicated by the intra prediction angle of the respective intra prediction mode. Only reference samples from the part of $p_{ref}$ which is to be used for prediction are mapped to $p_{1,ref}$. The actual mapping of the reference samples to $p_{1,ref}$ for each angular prediction mode is depicted in FIGS. 8 and 9 for horizontal and vertical angular prediction directions, respectively. The reference samples set $p_{1,ref}$ is constructed once for the predicted block. The prediction is then derived from two neighboring reference samples in the set as detailed below. As can be seen from FIGS. 8 and 9 the 1-dimensional reference sample set is not completely filled for all intra prediction modes. Only the locations which are in the projection range for the corresponding intra prediction direction are included in the set.

The prediction for both, horizontal and vertical prediction modes is performed in the same manner with only swapping the x and y coordinates of the block. The prediction from $p_{1,ref}$ is performed in $\frac{1}{32}$-pel accuracy. Depending on the value of the angle parameter pang, a sample offset $i_{idx}$ in $p_{1,ref}$ and a weighting factor $i_{fact}$ for a sample at position (x, y) are determined. Here, the derivation for the vertical modes is provided. The derivation for the horizontal modes follows accordingly, swapping x and y.

$$i_{idx} = (y+1) \cdot \frac{p_{ang}}{32}, \quad i_{fact} = [(y+1) \cdot p_{ang}] \bmod 32.$$

If $i_{fact}$ is not equal to 0, i.e. the prediction does not fall exactly on a full sample location in $p_{1,ref}$, a linear weighting between the two neighboring sample locations in $p_{1,ref}$ is performed as $$B_c(x, y) = \frac{32 - i_{fact}}{32} \cdot p_{1,ref}(x + i_{idx} + 1) + \frac{i_{fact}}{32} \cdot p_{1,ref}(x + i_{idx} + 2),$$

with $0 \le x$, y<Nc. It should be noted that the values of $i_{idx}$ and $i_{fact}$ only depend on y and therefore only need to be calculated once per row (for vertical prediction modes).

The VTM-1.0 (Versatile Test Model) uses 35 Intra modes whereas the BMS (Benchmark Set) uses 67 Intra modes. Intra-prediction is a mechanism used in many video coding frameworks to increase compression efficiency in the cases where only a given frame can be involved.

FIG. 10A shows an example of 67 intra prediction modes, e.g., as proposed for VVC, the plurality of intra prediction modes of 67 intra prediction modes comprising: planar mode (index 0), dc mode (index 1), and angular modes with indices 2 to 66, wherein the left bottom angular mode in FIG. 10A refers to index 2 and the numbering of the indices being incremented until index 66 being the top right most angular mode of FIG. 10A.

As shown in FIGS. 10B-10C, the latest version of JEM has some modes corresponding to skew intra prediction directions. For any of these modes, to predict samples within a block interpolation of a set of neighboring reference samples should be performed, if a corresponding position within a block side is fractional. HEVC and VVC uses linear interpolation between two adjacent reference samples. JEM uses more sophisticated 4-tap interpolation filters. Filter coefficients are selected to be either Gaussian or Cubic ones depending on the width or on the height value. Decision on whether to use width or height is harmonized with the decision on main reference side selection: when intra prediction mode is greater or equal to diagonal mode, top side of reference samples is selected to be the main reference side and width value is selected to determine interpolation filter in use. Otherwise, main reference side is selected from the left side of the block and height controls the filter selection process. Specifically, if selected side length is smaller than or equal to 8 samples, Cubic interpolation 4 tap is applied. Otherwise, interpolation filter is a 4-tap Gaussian one.

Specific filter coefficient used in JEM are given in Table 1. Predicted sample is calculated by convoluting with coefficients selected from Table 1 according to subpixel offset and filter type as follows:

$$s(x) = \left( \sum_{i=0}^{i<4} (ref_{i+x} \cdot c_i) + 128 \right) \gg 8$$

In this equation, ">>" indicates a bitwise shift-right operation.

If Cubic filter is selected, predicted sample is further clipped to the allowed range of values, that is either defined in SPS or derived from the bit depth of the selected component.

TABLE 1

| Subpixel offset | Cubic filter | | | | Gauss filter | | | |
|---|---|---|---|---|---|---|---|---|
| | $c_0$ | $c_1$ | $c_2$ | $c_3$ | $c_0$ | $c_1$ | $c_2$ | $c_3$ |
| 0 (integer) | 0 | 256 | 0 | 0 | 47 | 161 | 47 | 1 |
| 1 | −3 | 252 | 8 | −1 | 43 | 161 | 51 | 1 |
| 2 | −5 | 247 | 17 | −3 | 40 | 160 | 54 | 2 |
| 3 | −7 | 242 | 25 | −4 | 37 | 159 | 58 | 2 |
| 4 | −9 | 236 | 34 | −5 | 34 | 158 | 62 | 2 |
| 5 | −10 | 230 | 43 | −7 | 31 | 156 | 67 | 2 |
| 6 | −12 | 224 | 52 | −8 | 28 | 154 | 71 | 3 |
| 7 | −13 | 217 | 61 | −9 | 26 | 151 | 76 | 3 |
| 8 | −14 | 210 | 70 | −10 | 23 | 149 | 80 | 4 |
| 9 | −15 | 203 | 79 | −11 | 21 | 146 | 85 | 4 |
| 10 | −16 | 195 | 89 | −12 | 19 | 142 | 90 | 5 |
| 11 | −16 | 187 | 98 | −13 | 17 | 139 | 94 | 6 |
| 12 | −16 | 179 | 107 | −14 | 16 | 135 | 99 | 6 |
| 13 | −16 | 170 | 116 | −14 | 14 | 131 | 104 | 7 |
| 14 | −17 | 162 | 126 | −15 | 13 | 127 | 108 | 8 |
| 15 | −16 | 153 | 135 | −16 | 11 | 123 | 113 | 9 |
| 16 (half-pel) | −16 | 144 | 144 | −16 | 10 | 118 | 118 | 10 |
| 17 | −16 | 135 | 153 | −16 | 9 | 113 | 123 | 11 |
| 18 | −15 | 126 | 162 | −17 | 8 | 108 | 127 | 13 |
| 19 | −14 | 116 | 170 | −16 | 7 | 104 | 131 | 14 |
| 20 | −14 | 107 | 179 | −16 | 6 | 99 | 135 | 16 |
| 21 | −13 | 98 | 187 | −16 | 6 | 94 | 139 | 17 |
| 22 | −12 | 89 | 195 | −16 | 5 | 90 | 142 | 19 |
| 23 | −11 | 79 | 203 | −15 | 4 | 85 | 146 | 21 |
| 24 | −10 | 70 | 210 | −14 | 4 | 80 | 149 | 23 |
| 25 | −9 | 61 | 217 | −13 | 3 | 76 | 151 | 26 |
| 26 | −8 | 52 | 224 | −12 | 3 | 71 | 154 | 28 |
| 27 | −7 | 43 | 230 | −10 | 2 | 67 | 156 | 31 |
| 28 | −5 | 34 | 236 | −9 | 2 | 62 | 158 | 34 |
| 29 | −4 | 25 | 242 | −7 | 2 | 58 | 159 | 37 |
| 30 | −3 | 17 | 247 | −5 | 2 | 54 | 160 | 40 |
| 31 | −1 | 8 | 252 | −3 | 1 | 51 | 161 | 43 |

Another set of interpolation filters that have 6-bit precision is presented in Table 2.

TABLE 2

| | Unified intra/inter filter | | | | Gaussian filter | | | |
|---|---|---|---|---|---|---|---|---|
| Subpixel offset | $c_0$ | $c_1$ | $c_2$ | $c_3$ | $c_0$ | $c_1$ | $c_2$ | $c_3$ |
| 0 (integer) | 0 | 64 | 0 | 0 | 16 | 32 | 16 | 0 |
| 1 | -1 | 63 | 2 | 0 | 15 | 29 | 17 | 3 |
| 2 | -2 | 62 | 4 | 0 | 14 | 29 | 18 | 3 |
| 3 | -2 | 60 | 7 | -1 | 14 | 29 | 18 | 3 |
| 4 | -2 | 58 | 10 | -2 | 14 | 28 | 18 | 4 |
| 5 | -3 | 57 | 12 | -2 | 13 | 28 | 19 | 4 |
| 6 | -4 | 56 | 14 | -2 | 12 | 28 | 20 | 4 |
| 7 | -4 | 55 | 15 | -2 | 12 | 27 | 20 | 5 |
| 8 | -4 | 54 | 16 | -2 | 11 | 27 | 21 | 5 |
| 9 | -5 | 53 | 18 | -2 | 11 | 27 | 21 | 5 |
| 10 | -6 | 52 | 20 | -2 | 10 | 26 | 22 | 6 |
| 11 | -6 | 49 | 24 | -3 | 10 | 26 | 22 | 6 |
| 12 | -6 | 46 | 28 | -4 | 9 | 26 | 23 | 6 |
| 13 | -5 | 44 | 29 | -4 | 9 | 26 | 23 | 6 |
| 14 | -4 | 42 | 30 | -4 | 8 | 25 | 24 | 7 |
| 15 | -4 | 39 | 33 | -4 | 8 | 25 | 24 | 7 |
| 16 (half-pel) | -4 | 36 | 36 | -4 | 7 | 25 | 25 | 7 |
| 17 | -4 | 33 | 39 | -4 | 7 | 24 | 25 | 8 |
| 18 | -4 | 30 | 42 | -4 | 7 | 24 | 25 | 8 |
| 19 | -4 | 29 | 44 | -5 | 6 | 23 | 26 | 9 |
| 20 | -4 | 28 | 46 | -6 | 6 | 23 | 26 | 9 |
| 21 | -3 | 24 | 49 | -6 | 6 | 22 | 26 | 10 |
| 22 | -2 | 20 | 52 | -6 | 6 | 22 | 26 | 10 |
| 23 | -2 | 18 | 53 | -5 | 5 | 21 | 27 | 11 |
| 24 | -2 | 16 | 54 | -4 | 5 | 21 | 27 | 11 |
| 25 | -2 | 15 | 55 | -4 | 5 | 20 | 27 | 12 |
| 26 | -2 | 14 | 56 | -4 | 4 | 20 | 28 | 12 |
| 27 | -2 | 12 | 57 | -3 | 4 | 19 | 28 | 13 |
| 28 | -2 | 10 | 58 | -2 | 4 | 18 | 28 | 14 |
| 29 | -1 | 7 | 60 | -2 | 3 | 18 | 29 | 14 |
| 30 | 0 | 4 | 62 | -2 | 3 | 18 | 29 | 14 |
| 31 | 0 | 2 | 63 | -1 | 3 | 17 | 29 | 15 |

Intra-predicted sample is calculated by convoluting with coefficients selected from Table 2 according to subpixel offset and filter type as follows:

$$s(x) = \left( \sum_{i=0}^{i<4} (ref_{i+x} \cdot c_i) + 32 \right) \gg 6$$

In this equation, ">>" indicates a bitwise shift-right operation.

Another set of interpolation filters that have 6-bit precision is presented in Table 3.

TABLE 3

| | Chroma DCT-IF filter | | | | Gaussian filter | | | |
|---|---|---|---|---|---|---|---|---|
| Subpixel offset | $c_0$ | $c_1$ | $c_2$ | $c_3$ | $c_0$ | $c_1$ | $c_2$ | $c_3$ |
| 0 (integer) | 0 | 64 | 0 | 0 | 16 | 32 | 16 | 0 |
| 1 | -1 | 63 | 2 | 0 | 15 | 29 | 17 | 3 |
| 2 | -2 | 62 | 4 | 0 | 15 | 29 | 17 | 3 |
| 3 | -2 | 60 | 7 | -1 | 14 | 29 | 18 | 3 |
| 4 | -2 | 58 | 10 | -2 | 13 | 29 | 18 | 4 |
| 5 | -3 | 57 | 12 | -2 | 13 | 28 | 19 | 4 |
| 6 | -4 | 56 | 14 | -2 | 13 | 28 | 19 | 4 |
| 7 | -4 | 55 | 15 | -2 | 12 | 28 | 20 | 4 |
| 8 | -4 | 54 | 16 | -2 | 11 | 28 | 20 | 5 |
| 9 | -5 | 53 | 18 | -2 | 11 | 27 | 21 | 5 |
| 10 | -6 | 52 | 20 | -2 | 10 | 27 | 22 | 5 |
| 11 | -6 | 49 | 24 | -3 | 9 | 27 | 22 | 6 |
| 12 | -6 | 46 | 28 | -4 | 9 | 26 | 23 | 6 |

TABLE 3-continued

| | Chroma DCT-IF filter | | | | Gaussian filter | | | |
|---|---|---|---|---|---|---|---|---|
| Subpixel offset | $c_0$ | $c_1$ | $c_2$ | $c_3$ | $c_0$ | $c_1$ | $c_2$ | $c_3$ |
| 13 | -5 | 44 | 29 | -4 | 9 | 26 | 23 | 6 |
| 14 | -4 | 42 | 30 | -4 | 8 | 25 | 24 | 7 |
| 15 | -4 | 39 | 33 | -4 | 8 | 25 | 24 | 7 |
| 16 (half-pel) | -4 | 36 | 36 | -4 | 8 | 24 | 24 | 8 |
| 17 | -4 | 33 | 39 | -4 | 7 | 24 | 25 | 8 |
| 18 | -4 | 30 | 42 | -4 | 7 | 24 | 25 | 8 |
| 19 | -4 | 29 | 44 | -5 | 6 | 23 | 26 | 9 |
| 20 | -4 | 28 | 46 | -6 | 6 | 23 | 26 | 9 |
| 21 | -3 | 24 | 49 | -6 | 6 | 22 | 27 | 9 |
| 22 | -2 | 20 | 52 | -6 | 5 | 22 | 27 | 10 |
| 23 | -2 | 18 | 53 | -5 | 5 | 21 | 27 | 11 |
| 24 | -2 | 16 | 54 | -4 | 5 | 20 | 28 | 11 |
| 25 | -2 | 15 | 55 | -4 | 4 | 20 | 28 | 12 |
| 26 | -2 | 14 | 56 | -4 | 4 | 19 | 28 | 13 |
| 27 | -2 | 12 | 57 | -3 | 4 | 19 | 28 | 13 |
| 28 | -2 | 10 | 58 | -2 | 4 | 18 | 29 | 13 |
| 29 | -1 | 7 | 60 | -2 | 3 | 18 | 29 | 14 |
| 30 | 0 | 4 | 62 | -2 | 3 | 17 | 29 | 15 |
| 31 | 0 | 2 | 63 | -1 | 3 | 17 | 29 | 15 |

FIG. 11 illustrates a schematic diagram of a plurality of intra prediction modes used in the HEVC UIP scheme. For luminance blocks, the intra prediction modes may comprise up to 36 intra prediction modes, which may include three non-directional modes and 33 directional modes. The non-directional modes may comprise a planar prediction mode, a mean (DC) prediction mode, and a chroma from luma (LM) prediction mode. The planar prediction mode may perform predictions by assuming a block amplitude surface with a horizontal and vertical slope derived from the boundary of the block. The DC prediction mode may perform predictions by assuming a flat block surface with a value matching the mean value of the block boundary. The LM prediction mode may perform predictions by assuming a chroma value for the block matches the luma value for the block. The directional modes may perform predictions based on adjacent blocks as shown in FIG. 11.

H.264/AVC and HEVC specifies that a low-pass filter could be applied to reference samples prior being used in intra prediction process. A decision on whether to use reference sample filter or not is determined by intra prediction mode and block size. This mechanisms may be referred to as Mode Dependent Intra Smoothing (MDIS). There also exists a plurality of methods related to MDIS. For example, the Adaptive Reference Sample Smoothing (ARSS) method may explicitly (i.e. a flag is included into a bitstream) or implicitly (i.e., for example, data hiding is used to avoid putting a flag into a bitstream to reduce signaling overhead) signal whether the prediction samples are filtered. In this case, the encoder may make the decision on smoothing by testing the Rate-Distortion (RD) cost for all potential intra prediction modes.

In VVC, a partitioning mechanism based on both quad-tree and binary tree and known as QTBT is used. As depicted in FIG. 12, QTBT partitioning can provide not just square but rectangular blocks as well. Of course, some signaling overhead and increased computational complexity at the encoder side are the price of the QTBT partitioning as compared to conventional quad-tree based partitioning used in the HEVC/H.265 standard. Nevertheless, the QTBT-based partitioning is endowed with better segmentation properties and, hence, demonstrates significantly higher coding efficiency than the conventional quad-tree.

Leaves of the trees used for partitioning are being processed in a Z-scan order, so that the current block corresponding to the current leaf will have left and above neighbor blocks that are already reconstructed during encoding or decoding processes, unless the current block is located on the boundary of the slice. This is also illustrated in FIG. 12. Left-to-right scan of the leaves of the tree shown in the right part of FIG. 12 corresponds to the spatial Z-scan order of the blocks shown in the right part of this figure. The same scan is applied in case of quad-tree or multi-type trees.

For directional intra prediction, reference samples are obtained from the samples of the previously reconstructed neighboring blocks. Depending on the size of the block and intra prediction mode, a filter could be applied to the reference samples prior they are used to obtain values of predicted samples.

In case of boundary smoothing and PDPC, several first columns or several first rows of predicted block is combined with the additional prediction signal generated from the neighboring samples.

When intra prediction is performed using horizontal intra prediction mode (for example, as illustrated in FIG. 10C as mode 18), reference samples from the left side of the predicted block are column-wise replicated, so that all samples within a row is set equal to the reference sample located on the this row at the left side of the predicted block.

When intra prediction is performed using vertical intra prediction mode (for example, as illustrated in FIG. 10C as mode 50), reference samples from the top side of the predicted block are row-wise replicated, so that all samples within a column is set equal to the reference sample located on the this column at the top side of the predicted block.

In [A. Minezawa, K. Sugimoto, and S. Sekiguchi, "An improved intra vertical and horizontal prediction," contribution JCTVC-F172 to the 6th JCT-VC meeting, Torino, Italy, July 2011], the derivation process for vertical and horizontal intra prediction modes is specified as follows:

Vertical Prediction $$S'(x, y) = S(x, -1) + (S(-1, y) - S(-1, -1))/2^{x+1}$$

Horizontal Prediction $$S'(x, y) = S(-1, y) + (S(x, -1) - S(-1, -1))/2^{y+1}$$

where (x,y) indicates the position of prediction sample in a luma prediction block as shown in FIG. 13A, S'(x, y) denotes predicted samples and S(x, y) denotes the reference sample to be used for conventional prediction.

Since the value of S"(x, y) can fall out of the range of the minimum $p_{MIN}$ and the maximum $p_{MAX}$ values of a predicted sample, a clipping function should be applied to, for example, as follows:

$$S"(x,y) = Clip3(p_{MIN}, p_{MAX}, S'(x,y)),$$

where Clip3( ) is a clipping function. Exemplary definition of this function is given further.

For a predicted sample S(x, y) a nearest reference sample located above the predicted sample could be specified as S(x,−1). This nearest reference sample is located at the same column with the predicted sample.

Similarly, nearest reference sample located to the left of the predicted sample could be specified as S(−1, y). This nearest reference sample is located at the same row with the predicted sample.

Particular implementation of simplified PDPC could be performed differently, depending on the intra prediction mode:

For planar, DC, HOR/VER intra prediction modes (denoted as 0, 1, 18, 50 respectively in FIG. 10B and FIG. 10C), the following steps are performed:

The predicted sample P(x, y) located at (x, y) is calculated as follows:

$$P(x, y) = Clip1Cmp( (wL \times R_{-1,y} + wT \times R_{x,-1} - \qquad (1)$$
$$wTL \times R_{-1,-1} + (64 - wl - wT \mp wTL) \times P(x, y) + 32) ) \gg 6)$$

where $R_{x,-1}$, $R_{-1,y}$ represent the reference samples located at top and left of the current sample (x, y), and $R_{-1,-1}$ represents the top-left sample, i.e. a reference sample located in the top-left corner of the current block, the function clip1Cmp is set as follows:

If cIdx is equal to 0, clip1Cmp is set equal to Clip1Y,
Otherwise, clip1Cmp is set equal to Clip1C $$Clip1_Y(x) = Clip3(0, (1 \ll BitDepth_Y) - 1, x)$$
$$Clip1_C(x) = Clip3(0, (1 \ll BitDepth_C) - 1, x)$$
$$Clip3(x, y, z) = \begin{cases} x; & z < x \\ y; & z > y \\ z; & \text{otherwise} \end{cases}$$

BitDepth$_Y$ is the bit depth of luma samples.
BitDepth$_C$ is the bit depth of chroma samples.
BitDepth$_Y$ and BitDepth$_C$ could be signaled in sequence parameter set (SPS) of a bitstream.

Alternative definitions of Clip1Y(x) and Clip1C(x) are possible. In particular, as described by F. Galpin, P. Bordes, and F. Le Léannec in contribution JVET-C0040 "Adaptive Clipping in JEM2.0", Clip1Cmp(x)=Clip3(min$_C$, max$_C$,x),
  where min$_C$ is the lower clipping bound used in current slice for component ID C,
  max$_C$ is the upper clipping bound used in current slice for component ID C,
  C is a color component (e.g., Y for luma, Cb and Cr for chroma),
  "x>>y" is an arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.
  The DC mode weights are calculated as follows:

$$wT = 32 \gg ((y \ll 1) \gg shift), wL = 32 \gg ((x \ll 1) \gg shift),$$
$$wTL = -(wL \gg 4) - (wT \gg 4),$$

Where shift=(log$_2$(width)+log$_2$(height)+2)>>2.

For planar mode, wTL=0, while for the horizontal mode wTL=wT and for vertical mode wTL=wL. DC mode PDPC weights (wL, wT, wTL) for (0, 0) and (1, 0) positions inside one 4×4 block are shown in FIG. 13B. From this Figure it follows, that clipping operation in (1) is mandatory and the state-of-the-art PDPC implementation has a potential flaw. The following example illustrates the case when the result could be out of the range determined by $BitDepth_Y$ or $BitDepth_C$:

Given $R_{-1,y}=0$, $R_{x,-1}=0$, $R_{-1,-1}=100$, $P(x,y)=0$, from (1) it follows that for (0,0) position of a 4×4 predicted block $P(x,y)=Clip1Cmp((wL×R_{-1,y}+wT×R_{x,-1}±wTL×R_{-1,-1}+(64-wl-wT±wTL)×P(x,y)+32))>6)=Clip1Cmp((wTL×R_{-1,-1}+32)>>6)=Clip1Cmp((-4×100+32)>>6)$, $wTL=4$ as shown in FIG. 13B.

As seen from the example above, a negative value "$-4×100+32=-368$" is being right-shifted using arithmetic bit shift. Depending on the implementation, arithmetic right bit shift of negative value may lead to different output (e.g., in case of C/C++ programming language) and thus it could not be guaranteed that Clip1Cmp( ) output will always be 0, since the result of shifting a negative value to the right may have positive sign and non-zero magnitude in specific implementations.

For diagonal (denoted as 2 and 66 in FIG. 10B and FIG. 10C) and adjacent modes (directional modes not less than 58 and not greater than 10 in FIG. 10B or FIG. 10C) processing is performed as described below using the same formula (1).

FIG. 14A illustrates the definition of reference samples $R_{x,-1}$, $R_{-1,y}$ and $R_{-1,-1}$ for the extension of PDPC to the top-right diagonal mode. The prediction sample pred(x', y') is located at (x', y') within the prediction block. The coordinate x of the reference sample $R_{x,-1}$ is given by: $x=x'+y'+1$, and the coordinate y of the reference sample $R_{-1,y}$ is similarly given by: $y=x'+y'+1$.

The PDPC weights for the top-right diagonal mode are:

$$wT = 16 \gg ((y' \ll 1) \gg shift), wL = 16 \gg ((x' \ll 1) \gg shift), wtL = 0.$$

Similarly, FIG. 14B illustrates the definition of reference samples $R_{x,-1}$, $R_{-1,y}$ and $R_{-1,-1}$ for the extension of PDPC to the bottom-left diagonal mode. The coordinate x of the reference sample $R_{x,-1}$ is given by: $x=x'+y'+1$, and the coordinate y of the reference sample $R_{-1,y}$ is: $y=x'+y'+1$. The PDPC weights for the top-right diagonal mode are: $wT=16>>((y'<<1)>>shift)$, $wL=16>>((x'<<1)>>shift)$, $wTL=0$. The case of an adjacent top-right diagonal mode is illustrated in FIG. 14C. The PDPC weights for an adjacent top-right diagonal mode are: $wT=32>>((y'<<1)>>shift)$, $wL=0$, $wTL=0$. Similarly, the case of an adjacent bottom-left diagonal mode is illustrated in FIG. 14D. The PDPC weights for an adjacent bottom-left diagonal mode are: $wL=32>>((x'<<1)>>shift)$, $wT=0$, $wTL=0$. The reference sample coordinates for the last two cases are computed using the tables that are already used for angular mode intra prediction. Linear interpolation of the reference samples is used if fractional reference sample coordinates are calculated.

Simplified PDPC could be performed as specified in the VVC specification. Further the following denotation are used:

$$invAngle = Round\left(\frac{256*32}{intraPredAngle}\right),$$

$$Round(x) = Sign(x) * Floor(Abs(x)+0.5),$$

$$Sign(x) = \begin{cases} 1; & x > 0 \\ 0; & x == 0 \\ -1; & x < 0 \end{cases}$$

Floor(x) is the largest integer less than or equal to x,

Log 2(x) is the base-2 logarithm of x.

intraPredAngle is the angle parameter specified in Table 6,

A=C?B:D is a ternary assignment operation, where A is set equal to B if condition C is true. Otherwise, if condition C is false, A is set equal to D.

INTRA_PLANAR is a planar intra prediction mode( )

INTRA_DC is a DC intra prediction mode,

INTRA_ANGULARXX is a one of directional intra prediction modes, where XX denotes its number and corresponding direction shown in FIG. 14B.

If a term is not explained herein, it is understood that its definition can be found in the VVC specification or HEVC/H.265 standard specification.

Given the denotations above, the steps of simplified PDPC could be defined as follows: Inputs to this process are:

the intra prediction mode predModeIntra, a variable nTbW specifying the transform block width, a variable nTbH specifying the transform block height, a variable refW specifying the reference samples width, a variable refH specifying the reference samples height, the predicted samples predSamples[x][y], with x=0 . . . nTbW-1, y=0 . . . nTbH-1, the neighbouring samples p[x][y], with x=-1, y=-1 . . . refH-1 and x=0 . . . refW-1, y=-1, a variable cIdx specifying the color component of the current block.

Outputs of this process are the modified predicted samples predSamples[x][y] with x=0 . . . nTbW-1, y=0 . . . nTbH-1.

Depending on the value of cIdx, the function clip1Cmp is set as follows:

If cIdx is equal to 0, clip1Cmp is set equal to $Clip1_Y$.

Otherwise, clip1Cmp is set equal to $Clip1_C$.

The variable nScale is set to $((Log_2(nTbW)+Log_2(nTbH)-2)>>2)$.

The reference sample arrays mainRef[x] and sideRef[y], with x=0 . . . refW-1 and y=0 . . . refH-1 are derived as follows:

$$mainRef[x] = p[x][-1]$$

$$sideRef[y] = p[-1][y]$$

The variables refL[x][y], refT[x][y], wT[y], wL[x] and wTL[x][y] with x=0 . . . nTbW-1, y=0 . . . nTbH-1 are derived as follows:

If predModeIntra is equal to INTRA_PLANAR, INTRA_DC, INTRA_ANGULAR18, or INTRA_ANGULAR50, the following applies:

$$refL[x][y] = p[-1][y]$$

$$refT[x][y] = p[x][-1]$$

$$wT[y] = 32 \gg ((y \ll 1) \gg nScale)$$

$$wL[x] = 32 \gg ((x \ll 1) \gg nScale)$$

-continued $$wTL[\,x\,]\,[\,y\,] =$$

$$(\,predModeIntra == INTRA\_DC\,)\,?\,((\,wL[\,x\,] \gg 4\,) + (\,wT[\,y\,] \gg 4\,))\!:\!0$$

{x,y} define position of a predicted sample, wT, wL and wTL are weights associated with reference samples in accordance with the defined position, nScale is a scaling parameter that controls propagation distance (decay of weights wT and wL).

Otherwise, if predModeIntra is equal to INTRA_ANGU-LAR2 or INTRA_ANGULAR66, the following applies:

$$refL[\,x\,]\,[\,y\,] = p[\,-1\,]\,[\,x + y + 1\,]$$

$$refT[\,x\,]\,[\,y\,] = p[\,x + y + 1\,]\,[\,-1\,]$$

$$wT[\,y\,] = (\,32 \gg 1\,) \gg ((\,y \ll 1\,) \gg nScale\,)$$

$$wL[\,x\,] = (\,32 \gg 1\,) \gg ((\,x \ll 1\,) \gg nScale\,)$$

$$wTL[\,x\,]\,[\,y\,] = 0$$

Otherwise, if predModeIntra is less than or equal to INTRA_ANGULAR10, the following ordered steps apply:

1. The variables dXPos[y], dXFrac[y], dXInt[y] and dX[x][y] are derived as follows using invAngle:

$$dXPos[\,y\,] = ((\,y + 1\,) * invAngle + 2\,) \gg 2$$

$$dXFrac[\,y\,] = dXPos[\,y\,]\ \&\,63$$

$$dXInt[\,y\,] = dXPos\,[\,y\,] \gg 6$$

$$dX[\,x\,]\,[\,y\,] = x + dXInt[\,y\,]$$

2. The variables refL[x][y], refT[x][y], wT[y], wL[x] and wTL[x][y] are derived as follows:

$$refL[\,x\,]\,[\,y\,] = 0$$

$$refT[\,x\,]\,[\,y\,] = \qquad\qquad\qquad\qquad\text{(Eq. 1)}$$

$$(\,dX[\,x\,]\,[\,y\,] < refW - 1\,)\,?\,((\,64 - dXfrac[\,y\,]) * mainRef[\,dX[\,x\,]$$

$$[\,y\,]\,] + dXFrac[\,y\,] * mainRef[\,dX[\,x\,]\,[\,y\,] + 1\,] + 32\,) \gg 6\!:\!0$$

$$wT[\,y\,] = (\,dX[\,x\,]\,[\,y\,] < refW - 1\,)\,?\,32 \gg ((\,y \ll 1\,) \gg nScale\,)\!:\!0$$

$$wL[\,x\,] = 0$$

$$wTL[\,x\,]\,[\,y\,] = 0$$

Otherwise, if predModeIntra is greater than or equal to INTRA_ANGULAR58 (see FIG. 14B), the following ordered steps apply:

1. The variables dYPos[x], dYFrac[x], dYInt[x] and dY[x][y] are derived as follows using invAngle as specified in below depending on intraPredMode:

$$dYPos[\,x\,] = ((\,x + 1\,) * invAngle + 2\,) \gg 2$$

$$dYFrac[\,x\,] = dYPos[\,x\,]\ \&\,63$$

-continued $$dYInt[\,x\,] = dYPos[\,x\,] \gg 6$$

$$dY[\,x\,]\,[\,y\,] = y + dYInt[\,x\,]$$

2. The variables refL[x][y], refT[x][y], wT[y], wL[x] and wTL[x][y] are derived as follows:

$$refL[\,x\,]\,[\,y\,] = \qquad\qquad\qquad\qquad\text{(Eq. 2)}$$

$$(\,dY[\,x\,]\,[\,y\,] < refH - 1\,)\,?\,((\,64 - dYFrac[\,x\,]) * sideRef[\,dY[\,x\,]$$

$$[\,y\,]\,] + dYFrac[\,x\,] * sideRef[\,dY[\,x\,]\,[\,y\,] + 1\,] + 32\,) \gg 6\!:\!0$$

$$refT[\,x\,]\,[\,y\,] = 0$$

$$wT[\,y\,] = 0$$

$$wL[\,x\,] = (\,dY[\,x\,]\,[\,y\,] < refH - 1\,)\,?\,32 \gg ((\,x \ll 1\,) \gg nScale\,)\!:\!0$$

$$wTL[\,x\,]\,[\,y\,] = 0$$

Otherwise, refL[x][y], refT[x][y], wT[y], wL[x] and wTL [x][y] are all set equal to 0.

The values of the modified predicted samples predSamples [x][y], with x=0 . . . nTbW−1, y=0 . . . nTbH−1 are derived as follows:

$$predSamples[\,x\,]\,[\,y\,] =$$

$$clip1Cmp((\,refL[\,x\,]\,[\,y\,] * wL[\,x\,] + refT[\,x\,]\,[\,y\,] * wT[\,y\,] -$$

$$p[\,-1\,]\,[\,-1\,] * wTL[\,x\,]\,[\,y\,] +$$

$$(\,64 - wL[\,x\,] - wT[\,y\,] + wTL[\,x\,]\,[\,y\,]) * predSamples[\,x\,]\,[\,y\,] + 32\,) \gg 6\,)$$

In assignment Eq. 1 above simplified PDPC may use nearest-neighbor interpolation instead of linear one:

$$refT[\,x\,]\,[\,y\,] = (\,dX[\,x\,]\,[\,y\,] < refW - 1\,)\,?\,mainRef[\,dX[\,x\,]\,[\,y\,]\,]\!:\!0$$

Similarly, assignment Eq. 2 could also use nearest-neighbor interpolation:

$$refL[x][y] = (\,dY[x][y] < refH - 1\,)\,?\,sideRef[\,dY[x][y]\,]\!:\,0$$

Clipping may be removed just for several modes. Specifically for the DC intra prediction mode, wTL may be set to zero. Consequently, clip1Cmp( ) operation will not be required for PDPC if intra prediction mode is DC. The following rules or methods may be applied:

pdpc for DC does not use top-left (TL) sample;

clipping operation in PDPC is not performed for any intra prediction mode except for HOR and VER modes;

PDPC for HOR and VER mode uses clipping operation and do not use thresholding described in this application.

According to the description above, the specification could be modified in the following way:

If predModeIntra is equal to INTRA_PLANAR or INTRA_DC, the following applies:

$$refL[x][y] = p[-1][y] \tag{8-227}$$

$$refT[x][y] = p[x][-1] \tag{8-228}$$

$$wT[y] = 32 >> ((y << 1) >> nScale) \tag{8-229}$$

$$wL[x] = 32 >> ((x << 1) >> nScale) \tag{8-230}$$

$$wTL[x][y] = 0 \tag{8-231}$$

Otherwise, if predModeIntra is equal to INTRA_ANGULAR18 or INTRA_ANGULAR50, the following applies:

$$refL[x][y] = p[-1][y] \tag{8-232}$$

$$refT[x][y] = p[x][-1] \tag{8-233}$$

$$wT[y] = (predModernIntra == \tag{8-234}$$
$$INTRA\_ANGULAR18) ? 32 >> ((y << 1) >> nScale): 0$$

$$wL[y] = (predModernIntra == \tag{8-235}$$
$$INTRA\_ANGULAR50) ? 32 >> ((x << 1) >> nScale): 0$$

$$wTL[x][y] = (predModernIntra == \tag{8-236}$$
$$INTRA\_ANGULAR18) ? wT[y]: wL[x]$$

Otherwise, if predModeIntra is equal to INTRA_ANGULAR2 or INTRA_ANGULAR66, the following applies:

$$refL[x][y] = p[-1][x + y + 1] \tag{8-237}$$

$$refT[x][y] = p[x + y + 1][-1] \tag{8-238}$$

$$wT[y] = (32 >> 1) >> ((y << 1) >> nScale) \tag{8-239}$$

$$wL[x] = (32 >> 1) >> ((x << 1) >> nScale) \tag{8-240}$$

$$wTL[x][y] = 0 \tag{8-241}$$

Otherwise, if predModeIntra is less than or equal to INTRA_ANGULAR10, the following steps apply:

1. The variables dXPos[y], dXFrac[y], dXInt[y] and dX[x][y] are derived as follows using invAngle as specified in VVC specification draft depending on intraPredMode:

$$dXPos[y] = ((y + 1) * invAngle + 2) >> 2 \tag{8-242}$$
$$dXFrac[y] = dXPos[y] \& 63$$
$$dXInt[y] = dXPos[y] >> 6$$
$$dX[x][y] = x + dXInt[y]$$

2. The variables refL[x][y], refT[x][y], wT[y], wL[x] and wTL[x][y] are derived as follows:

$$refL[x][y] = 0 \tag{8-243}$$

$$refT[x][y] = (dX[x][y] < refW - 1) ? mainRef[dX[x][y] + \tag{8-244}$$
$$(dXFrac[y] >> 5)]: 0$$

$$wT[y] = \tag{8-245}$$
$$(dX[x][y] < refW - 1) ? 32 >> ((y << 1) >> nScale): 0$$

$$wL[x] = 0 \tag{8-246}$$

$$wTL[x][y] = 0 \tag{8-247}$$

Otherwise, if predModeIntra is greater than or equal to INTRA_ANGULAR58, the following ordered steps apply:

1. The variables dYPos[x], dYFrac [x], dYInt[x] and dY[x][y] are derived as follows using invAngle as specified in VVC specification draft depending on intraPredMode:

$$dYPos[x] = ((x + 1) * invAngle + 2) >> 2 \tag{8-248}$$
$$dYFrac[x] = dYPos[x] \& 63$$
$$dYInt[x] = dYPos[x] >> 6$$
$$dY[x][y] = y + dYInt[x]$$

2. The variables refL[x][y], refT[x][y], wT[y], wL[x] and wTL[x][y] are derived as follows:

$$refL[x][y] = (dY[x][y] < refH - 1) ? sideRef[dY[x][y] + \tag{8-249}$$
$$(dYFrac[x] >> 5)]: 0$$

$$refT[x][y] = 0 \tag{8-250}$$

$$wT[y] = 0 \tag{8-251}$$

$$wL[x] = (dY[x][y] < refH - 1) ? 32 >> ((x << 1) >> nScale): 0 \tag{8-252}$$

$$wTL[x][y] = 0 \tag{8-253}$$

Otherwise, refL[x][y], refT[x][y], wT[y], wL[x] and wTL[x][y] are all set equal to 0.

The values of the modified predicted samples predSamples[x][y], with x=0 . . . nTbW−1, y=0 . . . nTbH−1 are derived as follows:

If predModeIntra is equal to INTRA_ANGULAR18 or INTRA_ANGULAR50:

$$predSamples[x][y] = \tag{1*}$$
$$clip1Cmp((refL[x][y] * wL[x] + refT[x][y] * wT[y] -$$
$$p[-1][-1] * wTL[x][y] + (64 - wL[x] -$$
$$wT[y] + wTL[x][y]) * predSamples[x][y] ++32) >> 6)$$

Otherwise, the following applies:

$$predSamples[x][y] =$$

$$(refL[x][y]*wL[x] + refT[x][y]*wT[y] +$$

$$(64 - wL[x] - wT[y])*predSamples[x][y] + 32) >> 6$$

According to the text of specification above, the following modifications were introduced to the PDPC method:

when performing PDPC for DC, top-left sample is not considered;

clipping is applied to the PDPC output value of predicted samples only for horizontal and vertical the intra prediction modes. For all the other intra prediction modes clipping is not performed.

At both encoder and decoder sides, proposed method uses the following as the input data:

directional intra prediction mode (denoted further as predModeIntra, which is shown in FIG. 10B and FIG. 10C), block size parameter nTbS, which is set equal to (log 2nTbW)+Log$_2$(nTbH))>>1, where nTbW and nTbH denote width and height of the predicted block, respectively, and ">>" denotes a right-shift operation.

The modification of the VVC specification that enables usage of the proposed method may comprise substituting "the neighbouring samples p[x][y]" by "the reference samples p[x][y]" in the section describing simplified PDPC.

The angle parameter intraPredAngle denotes the subpixel offset between two adjacent rows of predicted samples in fixed point representation having length of fractional part equal to 5-bits. This parameter could be derived from the intra prediction mode is derived from predModeIntra and. An exemplary derivation of intraPredAngle from predModeIntra could be defined with a LUT, e.g., as it is shown in Table 6.

The values of the prediction samples predSamples[x][y], with x=0 . . . nTbW−1 and y=0 . . . nTbH−1, are derived as follows:

$$predV[x][y] = ((nTbH - 1 - y)*p[x][-1] + \tag{8-82}$$
$$(y+1)*p[-1][nTbH]) << Log2(nTbW)$$

$$predH[x][y] = ((nTbW - 1 - x)*p[-1][y] + \tag{8-83}$$
$$(x+1)*p[nTbW][-1]) << Log2(nTbH)$$

$$predSamples[x][y] = (predV[x][y] + predH[x][y] + \tag{8-84}$$
$$nTbW*nTbH) >> (Log2(nTbW) + Log2(nTbH) + 1$$

The proposed solution is an alternative PDPC method that does not have the flaw of equation (1*). Specifically, the method may comprise the following steps:

The predicted sample P(x, y) located at (x, y) is calculated as follows:

$$P(x, y) = \tag{2}$$
$$(wL \times R_{-1,y} + wT \times R_{x,-1} + (64 - wL - wT) \times P(x, y) + 32)) >> 6$$

where $R_{x,-1}$, $R_{-1,y}$ represents the reference samples located above and to the left of the current sample (x, y). It is worth noting that the function clip1Cmp is not in use in equation (2) since the values of the predicted sample P(x, y) are always in the range of valid values, i.e. between minimum and maximum of pixel values.

"x>>y" is an arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.

TABLE 6

An exemplary LUT to derive intraPredAngle from predModeIntra.

| predModeIntra | | | | | | | | | | | | | −14 | −13 | −12 | −11 |
|---|---|---|---|---|---|---|---|---|---|---|---|---|---|---|---|---|
| intraPredAngle | | | | | | | | | | | | | 512 | 341 | 256 | 171 |
| predModeIntra | −10 | −9 | −8 | −7 | −6 | −5 | −4 | −3 | −2 | −1 | 2 | 3 | 4 | 5 | 6 | 7 | 8 |
| intraPredAngle | 128 | 102 | 86 | 73 | 64 | 57 | 51 | 45 | 39 | 35 | 32 | 29 | 26 | 23 | 20 | 18 | 16 |
| predModeIntra | 9 | 10 | 11 | 12 | 13 | 14 | 15 | 16 | 17 | 18 | 19 | 20 | 21 | 22 | 23 | 24 | 25 |
| intraPredAngle | 14 | 12 | 10 | 8 | 6 | 4 | 3 | 2 | 1 | 0 | −1 | −2 | −3 | −4 | −6 | −8 | −10 |
| predModeIntra | 26 | 27 | 28 | 29 | 30 | 31 | 32 | 33 | 34 | 35 | 36 | 37 | 38 | 39 | 40 | 41 | 42 |
| intraPredAngle | −12 | −14 | −16 | −18 | −20 | −23 | −26 | −29 | −32 | −29 | −26 | −23 | −20 | −18 | −16 | −14 | −12 |
| predModeIntra | 43 | 44 | 45 | 46 | 47 | 48 | 49 | 50 | 51 | 52 | 53 | 54 | 55 | 56 | 57 | 58 | 59 |
| intraPredAngle | −10 | −8 | −6 | −4 | −3 | −2 | −1 | 0 | 1 | 2 | 3 | 4 | 6 | 8 | 10 | 12 | 14 |
| predModeIntra | 60 | 61 | 62 | 63 | 64 | 65 | 66 | 67 | 68 | 69 | 70 | 71 | 72 | 73 | 74 | 75 | 76 |
| intraPredAngle | 16 | 18 | 20 | 23 | 26 | 29 | 32 | 35 | 39 | 45 | 51 | 57 | 64 | 73 | 86 | 102 | 128 |
| predModeIntra | 77 | 78 | 79 | 80 | | | | | | | | | | | | | |
| intraPredAngle | 171 | 256 | 341 | 512 | | | | | | | | | | | | | |

From the current HEVC and VVC draft specification, planar intra prediction method is used. The part of the VVC draft 3 is incorporated below for reference:

8.2.4.2.5. Specification of INTRA_PLANAR Intra Prediction Mode

Inputs to this process are:

a variable nTbW specifying the transform block width, a variable nTbH specifying the transform block height, the neighbouring samples p[x][y], with x=−1, y=−1 . . . nTbH and x=0 . . . nTbW, y=−1.

Outputs of this process are the predicted samples predSamples[x][y], with x=0 . . . nTbW−1, y=0 . . . nTbH−1.

The DC mode weights are calculated as follows:

$$wT = 32 >> ((y << 1) >> shift), wL = 32 >> ((x << 1) >> shift),$$

Where shift=(log$_2$(width)+log$_2$(height)+2)>>2.

DC mode PDPC weights (wL, wT) for (0, 0) and (1, 0) positions inside one 4×4 block are shown in FIG. 15. It could be noticed, that in comparison with FIG. 13B, top-left reference sample is not used and weight for this sample is not specified.

This alternative method could be represented in the form of a part of VVC specification:

Position-Dependent Intra Prediction Sample Filtering Process

Inputs to this process are:

the intra prediction mode predModeIntra, a variable nTbW specifying the transform block width, a variable nTbH specifying the transform block height, a variable refW specifying the reference samples width, a variable refH specifying the reference samples height, the predicted samples predSamples[x][y], with x=0 . . . nTbW−1, y=0 . . . nTbH−1, the neighbouring samples p[x][y], with x=−1, y=−1 . . . refH−1 and x=0 . . . refW−1, y=−1, a variable cIdx specifying the colour component of the current block.

Outputs of this process are the modified predicted samples predSamples[x][y] with x=0 . . . nTbW−1, y=0 . . . nTbH−1.

Depending on the value of cIdx, the function clip1Cmp is set as follows:

If cIdx is equal to 0, clip1Cmp is set equal to $\text{Clip1}_Y$.

Otherwise, clip1Cmp is set equal to $\text{Clip1}_C$.

The variable nScale is set to (($\text{Log}_2$(nTbW)+$\text{Log}_2$(nTbH)−2)>>2).

The reference sample arrays mainRef[x] and sideRef[y], with x=0 . . . refW−1 and y=0 . . . refH−1 are derived as follows:

$$mainRef[x] = p[x][-1]$$

$$sideRef[y] = p[-1][y]$$

The variables refL[x][y], refT[x][y], wT[y] and wL[x] with x=0 . . . nTbW−1, y=0 . . . nTbH−1 are derived as follows:

If predModeIntra is equal to INTRA_PLANAR, INTRA_DC, INTRA_ANGULAR18, or INTRA_AN-GULAR50, the following applies:

$$refL[x][y] = p[-1][y]$$

$$refT[x][y] = p[x][-1]$$

$$wT[y] = 32 >> ((y << 1) >> nScale)$$

$$wL[x] = 32 >> ((x << 1) >> nScale)$$

Otherwise, if predModeIntra is equal to INTRA_ANGU-LAR2 or INTRA_ANGULAR66, the following applies:

$$refL[x][y] = p[-1][x + y + 1]$$

$$refT[x][y] = p[x + y + 1][-1]$$

$$wT[y] = (32 \gg 1) \gg ((y \ll 1) \gg nScale)$$

$$wL[x] = (32 \gg 1) \gg ((x \ll 1) \gg nScale)$$

Otherwise, if predModeIntra is less than or equal to INTRA_ANGULAR10, the following ordered steps apply:

1. The variables dXPos[y], dXFrac[y], dXInt[y] and dX[x][y] are derived as follows using invAngle depending on intraPredMode:

$$dXPos[y] = ((y + 1) * invAngle + 2) \gg 2$$

$$dXFrac[y] = dXPos[y] \& 63$$

$$dXInt[y] = dXPos[y] \gg 6$$

$$dX[x][y] = x + dXInt[y]$$

invAngle may be specified in VVC specification draft.

2. The variables refL[x][y], refT[x][y], wT[y], wL[x] are derived as follows:

$$refL[x][y] = 0$$

$$refT[x][y] =$$
$$(dX[x][y] < refW - 1)?((64 - dXFrac[y]) * mainRef[dX[x][y]] +$$
$$dXFrac[y] * mainRef[dX[x][y] + 1] + 32) \gg 6: 0$$

$$wT[y] = (dX[x][y] < refW - 1)?32 \gg ((y \ll 1) \gg nScale): 0$$

$$wL[x] = 0$$

Otherwise, if predModeIntra is greater than or equal to INTRA_ANGULAR58, the following ordered steps apply:

1. The variables dYPos[x], dYFrac[x], dYInt[x] and dY[x][y] are derived as follows using invAngle depending on intraPredMode:

$$dYPos[x] = ((x + 1) * invAngle + 2) \gg 2$$

$$dYFrac[x] = dYPos[x] \& 63$$

$$dYInt[x] = dYPos[x] \gg 6$$

$$dY[x][y] = y + dYInt[x]$$

invAngle may be specified in VVC specification draft.

2. The variables refL[x][y], refT[x][y], wT[y] and wL[x] are derived as follows:

$$refL[x][y] = (dY[x][y] < refH - 1)?((64 - dYFrac[x]) * sideRef[dY[x][y]] +$$
$$dYFrac[x] * sideRef[dY[x][y] + 1] + 32) \gg 6: 0$$

$$refT[x][y] = 0$$

$$wT[y] = 0$$

$$wL[x] = (dY[x][y] < refH - 1)?32 \gg ((x \ll 1) \gg nScale): 0$$

Otherwise, refL[x][y], refT[x][y], wT[y], wL[x] are all set equal to 0. The values of the modified predicted samples predSamples[x][y], with x=0 . . . nTbW−1, y=0 . . . nTbH−1 are derived as follows:

$$predSamples[x][y] = (refL[x][y] * wL[x] + refT[x][y] * wT[y] +$$
$$(64 - wL[x] - wT[y]) * predSamples[x][y] + 32) \gg 6)$$

Here "(64−wL[x]−wT[y])" stands for sample weighting factor.

FIG. 16 illustrates the above-described method. By dashed line the step of clipping is shown, that is performed in the state-of-the-art PDPC, but is not performed in the proposed method, since it is not required, because the only negative coefficient wTL is not used.

In FIG. 17, reference samples are used by the intra prediction process to produce predicted samples. Each predicted sample is further weighted using a sample weighting factor. The sample weighting factor may, for example, be equal to (64−wL[x]−wT[y]). The same reference samples are used to calculate additional values for each of the predicted samples depending on x and y, where x and y define the position of a predicted sample within a predicted block. These additional values are added to corresponding weighted predicted samples. Each sample resulting from this operation is then normalized by right-shifting it according to the predetermined precision of the sample weighting factor. For example, if the sample weighting factor is defined as (64−wL[x]−wT[y])) the precision is 6 bits. Therefore at this step a right-shift by 6 is performed in order to ensure that possible minimum and maximum values of the output values are the same as the possible minimum and maximum values of the reference samples.

One of the beneficial effects of the proposed solution is that the PLANAR intra prediction mechanism can be reused to calculate the additional values. Specifically, PLANAR intra prediction uses the following equation to derive horizontal and vertical predicted sample values:

$$predV[x][y] = \qquad (8\text{-}82)$$
$$((nTbH - 1 - y) * p[x][-1] + +(y + 1) * p[-1][nTbH]) \ll$$
$$Log2(nTbW)$$
$$predH[x][y] = \qquad (8\text{-}83)$$
$$((nTbW - 1 - x) * p[-1][y] + +(x + 1) * p[nTbW][-1]) \ll$$
$$Log2(nTbH)$$

From the two above equations it can be seen that predV [x][y] uses reference sample p[x][−1] located in the same column as predV[x][y] does and predH[x][y] uses the reference sample p[−1][y] located on the same row with predH[x][y]. Besides, left-shift operations are performed as the final step and thus can be skipped since they do not affect intermediate calculations that are being reused. nTbW, nTbH, x and y variables are inputs of PLANAR intra prediction method and thus could be adjusted correspondingly. Because of that it is possible to substitute (nTbW−1−x) by $D_x$ and (nTbH−1−y) by $D_y$ input variables. Bottom-left and top-right reference samples could be set to 0 since these are not a parameter being used.

Considering the above-described observations, equations above may be rewritten in accordance with its inputs being predetermined:

$$V_y = Dy * p[x][-1]$$
$$V_x = Dx * p[-1][y]$$

Thus, the following unifications could be performed:
an additional value in case of horizontal mode (mode 18) could be calculated as $V_y = Dy * p[x][-1]$, wherein $D_y$ is set equal to wT[y];
an additional value in case of vertical mode (mode 50) could be calculated as $V_x = Dx * p[-1][y]$, wherein $D_x$ is set equal to wL[y];

an additional value in case of DC mode (mode 1) could be calculated as $V_y + V_x$, wherein $D_x$ and $D_y$ are set as in the previous two cases.

By alternation of reference sample selection, it could be shown that unification could be performed for all the intra prediction modes that are specified for PDPC process.

When intra prediction mode is specified to be equal to DC, horizontal or vertical intra prediction modes, the resulting updated predicted sample should be clipped, e.g. as it is shown in FIG. 16 by a block with dashed border.

In case of horizontal or vertical intra prediction modes it is more beneficial to reposition the clipping operation before the last step of simplified PDPC when weighted predicted sample is being summed with an additional value. This additional value is obtained differently for different modes as described above.

Embodiments of the invention propose to threshold results of intermediate calculations that are performed to obtain the additional value for the cases of vertical or horizontal intra prediction modes are used in intra prediction. For these cases an additional value could be calculated in such a way that being added to the weighted predicted sample it will not require clipping operation.

The state-of-the-art PDPC methods applies clipping on the updated predicted sample (even for horizontal and vertical modes). Specifically:

$$predSamples[x][y] = clip1Cmp((refL[x][y] * wL[x] +$$
$$refT[x][y] * wT[y] - p[-1][-1] * wTL[x][y] +$$
$$(64 - wL[x] - wT[y] + wTL[x][y]) * predSamples[x][y] + 32) \gg 6)$$

For horizontal intra prediction mode wTL[x][y] is set equal to wT[y] thus leading to the simplified expression:

$$predSamples[x][y] = clip1Cmp(((refT[x][y] -$$
$$p[-1][-1]) * wT[y] + 64 * predSamples[x][y] + 32) \gg 6)$$

In this expression, "refT[x][y]−p [−1][−1]" is in fact the additional reference sample value. I.e., for the cases when the intra prediction mode is horizontal, additional reference sample value is set equal to the difference between the value of the nearest reference sample (refT[x][y]) located above the predicted sample and the value of the top-left reference sample (p[−1][−1]).

For the cases when intra prediction mode is vertical, additional reference sample value is set equal to the difference between the value of the nearest reference sample (refL[x][y]) located to the left of the predicted sample and the value of the top-left reference sample (p[1][−1]), i.e. to "refL[x][y]−p[−1][−1]".

Hence, it is possible to replace clipCmp function by thresholding operations over the additional reference sample value, i.e. "refT[x][y]−p[−1][−1]".

For a horizontal intra prediction mode:

$$predSamples[x][y] =$$
$$(T(refT[x][y] - p[-1][-1]) * wT[y] + 64 * predSamples[x][y] + 32) \gg 6,$$

where T( ) is a thresholding operation.

For a vertical intra prediction mode:

$$predSamples[x][y] =$$

$$(T(refL[x][y] - p[-1][-1]) * wT[y] + 64 * predSamples[x][y] + 32) \gg 6,$$

where T( ) is a thresholding operation.

Exemplary implementation of T( ) is given in FIG. 17. Thresholding operation T( ) of additional reference sample value is in fact updating the additional reference sample value in accordance with whether top-left reference sample value is greater than predicted sample value. In specific:

when the top-left reference sample value is greater than the predicted sample value, the lower limit is obtained by subtracting predicted sample value from the maximum value of the predicted sample, the updated additional reference sample value is set equal to the maximum of two values, the first value is the additional reference sample value, and the second value is the lower limit, otherwise, the upper limit is obtained by subtracting predicted sample value from the minimum value of the predicted sample, the updated additional reference sample value is set equal to the minimum of two values, the first value is the additional reference sample value, and the second value is the upper limit.

In FIG. 17, the closest reference sample is a nearest reference sample located to the left of the predicted sample when intra prediction is horizontal. When intra prediction is vertical, the closest reference sample is a nearest reference sample located above the predicted sample. From this figure it could be noticed that comparison result is used to switch both:

results of thresholding functions, i.e. minimum and maximum, and one of the arguments of the thresholding function.

It is noteworthy that Clip3( ) function provides two thresholding operations. One threshold is the minimum value of the predicted sample and the other one is the maximum value of the predicted sample. In comparison with Clip3( ) function applied to the updated predicted sample (FIG. 16), the proposed thresholding (FIG. 17) applies only one threshold: either the minimum value of the predicted sample or the maximum value of the predicted sample.

It could also be noticed that the above-described thresholding reposition enables usage of the same equation without clipping for all of the intra predicted modes, where PDPC is applicable.

FIG. 18 is a block diagram showing an example structure of an apparatus 1800 for intra predicting a block of a picture. The apparatus 1800 is configured to carry out the above methods, and may include:

an obtaining unit 1810, configured to obtain a predicted sample value from one or more reference sample values by intra-prediction using an intra prediction mode, obtain at least one additional reference sample value in accordance with the intra prediction mode, and obtain a thresholded additional reference sample value based on the additional reference sample value;

a calculating unit 1820, configured to calculate an additional value from the thresholded additional reference sample value, multiply the predicted sample value by a sample weighting factor, resulting in a weighted predicted sample value, add the additional value to the weighted predicted sample value, resulting in a non-normalized predicted sample value, and normalize the non-normalized predicted sample value, resulting in a normalized predicted sample value.

When intra prediction mode is vertical intra prediction mode, the additional reference sample value may be set equal to the difference between the value of the nearest reference sample located above the predicted sample and the value of the top-left reference sample.

When the intra prediction mode is horizontal intra prediction mode, the additional reference sample value may be set equal to the difference between the value of the nearest reference sample located to the left of the predicted sample and the value of the top-left reference sample.

When the intra prediction mode is DC intra prediction mode, the at least one additional reference sample value include a first additional reference sample value and a second additional reference sample value, and the first additional reference sample value and the second additional reference sample value may be obtained by:

setting the first additional reference sample value equal to the value of the nearest reference sample located to the left of the predicted sample, and setting the second additional reference sample value equal to the value of the nearest reference sample located to the above of the predicted sample.

When a top-left reference sample value is greater than or equal to the predicted sample value, an upper limit is obtained by subtracting predicted sample value from the maximum value of the predicted sample, the thresholded additional reference sample value is set equal to the maximum of a first value and a second value:

the first value is the additional reference sample value, and the second value is the upper limit.

When a top-left reference sample value is less than the predicted sample value, a lower limit is obtained by subtracting predicted sample value from the minimum value of the predicted sample, the thresholded additional reference sample value is set equal to the minimum of a first value and a second value:

the first value is the additional reference sample value, and the second value is the lower limit.

Following is an explanation of the applications of the encoding method as well as the decoding method as shown in the above-mentioned embodiments, and a system using them.

FIG. 19 is a block diagram showing a content supply system 3100 for realizing content distribution service. This content supply system 3100 includes capture device 3102, terminal device 3106, and optionally includes display 3126. The capture device 3102 communicates with the terminal device 3106 over communication link 3104. The communication link may include the communication channel 13 described above. The communication link 3104 includes but not limited to WIFI, Ethernet, Cable, wireless (3G/4G/5G), USB, or any kind of combination thereof, or the like.

The capture device 3102 generates data, and may encode the data by the encoding method as shown in the above embodiments. Alternatively, the capture device 3102 may distribute the data to a streaming server (not shown in the Figures), and the server encodes the data and transmits the encoded data to the terminal device 3106. The capture device 3102 includes but not limited to camera, smart phone or Pad, computer or laptop, video conference system, PDA, vehicle mounted device, or a combination of any of them, or the like. For example, the capture device 3102 may include the source device 12 as described above. When the data includes video, the video encoder 20 included in the capture device 3102 may actually perform video encoding processing. When the data includes audio (i.e., voice), an audio encoder included in the capture device 3102 may actually perform audio encoding processing. For some practical scenarios, the capture device 3102 distributes the encoded video and audio data by multiplexing them together. For other practical scenarios, for example in the video conference system, the encoded audio data and the encoded video data are not multiplexed. Capture device 3102 distributes the encoded audio data and the encoded video data to the terminal device 3106 separately.

In the content supply system 3100, the terminal device 310 receives and reproduces the encoded data. The terminal device 3106 could be a device with data receiving and recovering capability, such as smart phone or Pad 3108, computer or laptop 3110, network video recorder (NVR)/digital video recorder (DVR) 3112, TV 3114, set top box (STB) 3116, video conference system 3118, video surveillance system 3120, personal digital assistant (PDA) 3122, vehicle mounted device 3124, or a combination of any of them, or the like capable of decoding the above-mentioned encoded data. For example, the terminal device 3106 may include the destination device 14 as described above. When the encoded data includes video, the video decoder 30 included in the terminal device is prioritized to perform video decoding. When the encoded data includes audio, an audio decoder included in the terminal device is prioritized to perform audio decoding processing.

For a terminal device with its display, for example, smart phone or Pad 3108, computer or laptop 3110, network video recorder (NVR)/digital video recorder (DVR) 3112, TV 3114, personal digital assistant (PDA) 3122, or vehicle mounted device 3124, the terminal device can feed the decoded data to its display. For a terminal device equipped with no display, for example, STB 3116, video conference system 3118, or video surveillance system 3120, an external display 3126 is contacted therein to receive and show the decoded data.

When each device in this system performs encoding or decoding, the picture encoding device or the picture decoding device, as shown in the above-mentioned embodiments, can be used.

FIG. 20 is a diagram showing a structure of an example of the terminal device 3106. After the terminal device 3106 receives stream from the capture device 3102, the protocol proceeding unit 3202 analyzes the transmission protocol of the stream. The protocol includes but not limited to Real Time Streaming Protocol (RTSP), Hyper Text Transfer Protocol (HTTP), HTTP Live streaming protocol (HLS), MPEG-DASH, Real-time Transport protocol (RTP), Real Time Messaging Protocol (RTMP), or any kind of combination thereof, or the like.

After the protocol proceeding unit 3202 processes the stream, stream file is generated. The file is outputted to a demultiplexing unit 3204. The demultiplexing unit 3204 can separate the multiplexed data into the encoded audio data and the encoded video data. As described above, for some practical scenarios, for example in the video conference system, the encoded audio data and the encoded video data are not multiplexed. In this situation, the encoded data is transmitted to video decoder 3206 and audio decoder 3208 without through the demultiplexing unit 3204.

Via the demultiplexing processing, video elementary stream (ES), audio ES, and optionally subtitle are generated. The video decoder 3206, which includes the video decoder 30 as explained in the above mentioned embodiments, decodes the video ES by the decoding method as shown in the above-mentioned embodiments to generate video frame, and feeds this data to the synchronous unit 3212. The audio decoder 3208, decodes the audio ES to generate audio frame, and feeds this data to the synchronous unit 3212. Alternatively, the video frame may store in a buffer (not shown in FIG. Y) before feeding it to the synchronous unit 3212. Similarly, the audio frame may store in a buffer (not shown in FIG. Y) before feeding it to the synchronous unit 3212.

The synchronous unit 3212 synchronizes the video frame and the audio frame, and supplies the video/audio to a video/audio display 3214. For example, the synchronous unit 3212 synchronizes the presentation of the video and audio information. Information may code in the syntax using time stamps concerning the presentation of coded audio and visual data and time stamps concerning the delivery of the data stream itself.

If subtitle is included in the stream, the subtitle decoder 3210 decodes the subtitle, and synchronizes it with the video frame and the audio frame, and supplies the video/audio/subtitle to a video/audio/subtitle display 3216.

Embodiments of the present invention are not limited to the above-mentioned system, and either the picture encoding device or the picture decoding device in the above-mentioned embodiments can be incorporated into other system, for example, a car system.

Although embodiments of the invention have been primarily described based on video coding, it should be noted that embodiments of the coding system 10, encoder 20 and decoder 30 (and correspondingly the system 10) and the other embodiments described herein may also be configured for still picture processing or coding, i.e. the processing or coding of an individual picture independent of any preceding or consecutive picture as in video coding. In general only inter-prediction units 244 (encoder) and 344 (decoder) may not be available in case the picture processing coding is limited to a single picture 17. All other functionalities (also referred to as tools or technologies) of the video encoder 20 and video decoder 30 may equally be used for still picture processing, e.g. residual calculation 204/304, transform 206, quantization 208, inverse quantization 210/310, (inverse) transform 212/312, partitioning 262/362, intra-prediction 254/354, and/or loop filtering 220, 320, and entropy coding 270 and entropy decoding 304.

Although embodiments of the invention have been primarily described based on video coding, it should be noted that embodiments of the coding system 10, encoder 20 and decoder 30 (and correspondingly the system 10) and the other embodiments described herein may also be configured for still picture processing or coding, i.e. the processing or coding of an individual picture independent of any preceding or consecutive picture as in video coding. In general only inter-prediction units 244 (encoder) and 344 (decoder) may not be available in case the picture processing coding is limited to a single picture 17. All other functionalities (also referred to as tools or technologies) of the video encoder 20 and video decoder 30 may equally be used for still picture processing, e.g., residual calculation 204/304, transform 206, quantization 208, inverse quantization 210/310, (inverse) transform 212/312, partitioning 262/362, intra-prediction 254/354, and/or loop filtering 220, 320, and entropy coding 270 and entropy decoding 304.

Embodiments, e.g., of the encoder 20 and the decoder 30, and functions described herein, e.g., with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements. The processing circuitry mentioned in this disclosure may comprise hardware and software.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

The invention claimed is:

1. A method of intra predicting a block of a picture, comprising:
   - obtaining an intra prediction mode of a current block;
   - performing a clipping operation in position-dependent prediction combination (PDPC) when the intra prediction mode is horizontal intra prediction mode or vertical intra prediction mode, and wherein the clipping operation in PDPC is not performed when the intra prediction mode is DC mode or planar mode; and
   - performing PDPC based on a top sample or a left sample of the current block, and a top-left sample of the current block is not used for PDPC when the intra prediction mode is DC mode or planar mode.

2. The method of claim 1, wherein the clipping operation in PDPC is performed only when the intra prediction mode is the horizontal intra prediction mode or the vertical intra prediction mode.

3. The method of claim 1, when predModeIntra is equal to INTRA_ANGULAR18 or INTRA_ANGULAR50, the method further comprises applying:

$$predSamples[x][y] = \text{clip1}Cmp((refL[x][y] * wL[x] +$$
$$refT[x][y] * wT[y] - p[-1][-1] * wTL[x][y] +$$
$$(64 - wL[x] - wT[y] + wTL[x][y]) * predSamples[x][y] + 32) \gg 6);$$

wherein predModeIntra indicates the intra prediction mode, {x,y} define position of a predicted sample, wT, wL and wTL are weights associated with reference samples in accordance with a defined position, refL[x][y] indicates a nearest reference sample located to a left of the predicted sample, refT[x][y] indicates a nearest reference sample located above the predicted sample, and p[−1][−1] indicates a top-left sample of the current block.

4. The method of claim 1, wherein when predModeIntra is not equal to INTRA_ANGULAR18 or INTRA_ANGULAR50, the method further comprises applying:

$$predSamples[x][y] = (refL[x][y] * wL[x] + refT[x][y] * wT[y] +$$
$$(64 - wL[x] - wT[y]) * predSamples[x][y] + 32) \gg 6;$$

wherein predModeIntra indicates the intra prediction mode, {x,y} define position of a predicted sample, wT and wL are weights associated with reference samples in accordance with a defined position, refL[x][y] indicates a nearest reference sample located to a left of the predicted sample, refT[x][y] indicates a nearest reference sample located above the predicted sample, and p[−1][−1] indicates a top-left sample of the current block.

5. The method of claim 1, wherein when predModeIntra is equal to INTRA_PLANAR or INTRA_DC, the method further comprises applying:

$$wT[y] = 32 \gg ((y \ll 1) \gg nScale);$$

$$wL[x] = 32 \gg ((x \ll 1) \gg nScale);$$

$$wTL[x][y] = 0;$$

and wherein predModeIntra indicates the intra prediction mode, {x,y} define position of a predicted sample, wT, wL and wTL are weights associated with reference samples in accordance with a defined position, and nScale is a scaling parameter.

6. An apparatus, comprising:
one or more processors; and
a non-transitory computer-readable storage medium coupled to the one or more processors and storing programming for execution by the one or more processors, wherein the programming, when executed by the one or more processors, configures the apparatus to carry out the method according to claim 1, where the apparatus is an encoder or a decoder.

7. A non-transitory recording medium which includes one or more instructions, which when executed by one or more processors, cause the one or more processors to perform operations that generate a predictive-encoded bit stream decoded by an apparatus, the operations that generate the predictive-encoded bit stream are performed by the one or more processors according to the method of claim 1.

* * * * *